United States Patent
Kosaka

(10) Patent No.: US 11,827,307 B2
(45) Date of Patent: Nov. 28, 2023

(54) OPERATING DEVICE FOR HUMAN-POWERED VEHICLE

(71) Applicant: SHIMANO INC., Sakai (JP)

(72) Inventor: Kentaro Kosaka, Sakai (JP)

(73) Assignee: SHIMANO INC., Sakai (JP)

( * ) Notice: Subject to any disclaimer, the term of this patent is extended or adjusted under 35 U.S.C. 154(b) by 130 days.

(21) Appl. No.: 17/308,973

(22) Filed: May 5, 2021

(65) Prior Publication Data

US 2022/0355890 A1 Nov. 10, 2022

(51) Int. Cl.
*B62M 3/08* (2006.01)
*B62K 23/06* (2006.01)
*B62M 25/08* (2006.01)

(52) U.S. Cl.
CPC .............. *B62K 23/06* (2013.01); *B62M 25/08* (2013.01)

(58) Field of Classification Search
CPC ......... B62K 23/06; B62K 11/14; B62M 25/08
See application file for complete search history.

(56) References Cited

U.S. PATENT DOCUMENTS

| | | | | |
|---|---|---|---|---|
| 7,908,940 B2 * | 3/2011 | Naka | ...................... | B62M 25/08 74/551.8 |
| 8,297,143 B2 * | 10/2012 | Fujii | ...................... | B62M 25/04 74/473.12 |
| 9,073,595 B2 * | 7/2015 | Miki | ...................... | B62K 23/06 |
| 9,079,629 B2 | 7/2015 | Kosaka et al. | | |
| 9,211,936 B2 * | 12/2015 | Gao | ...................... | B62M 25/08 |
| 9,326,412 B2 | 4/2016 | Kosaka et al. | | |
| 9,428,247 B2 * | 8/2016 | Kosaka | ................... | B62M 25/08 |
| 10,414,463 B2 * | 9/2019 | Komatsu | ................ | B62M 25/08 |
| 10,556,637 B2 * | 2/2020 | Komatsu | ................ | B62M 25/08 |
| 10,676,156 B2 * | 6/2020 | Masciolini | .............. | H01H 5/02 |
| 11,479,318 B2 * | 10/2022 | Linke | ....................... | B62J 45/20 |
| 11,505,271 B2 * | 11/2022 | Kosaka | ................... | B62L 3/023 |
| 2014/0209439 A1 * | 7/2014 | Kosaka | ................... | B62K 23/06 200/61.54 |
| 2020/0356130 A1 | 11/2020 | Linke | | |

\* cited by examiner

*Primary Examiner* — Thomas C Diaz
(74) *Attorney, Agent, or Firm* — MORI & WARD, LLP

(57) ABSTRACT

An operating device for a human-powered vehicle comprises a base structure, a switch unit, an electric component, and an electric-component housing. The base structure is configured to be mounted to the human-powered vehicle. The switch unit is configured to be activated in response to a user input. The electric component is configured to be electrically connected to the switch unit. The electric-component housing is configured to be detachably coupled to the base structure. The electric-component housing is configured to support the electric component such that the electric component is detachably coupled to the base structure via the electric-component housing.

23 Claims, 33 Drawing Sheets

OPERATING DEVICE FOR HUMAN-POWERED VEHICLE

BACKGROUND OF THE INVENTION

Field of the Invention

The present invention relates to an operating device for a human-powered vehicle.

Discussion of the Background

A human-powered vehicle includes an operating unit configured to operate an operated unit. The operating unit is configured to operate a device in response to a user operation. The operating unit is used for a variety of human-powered vehicles. One object of the present disclosure is to adapt an operating device to a variety of specifications of operating devices.

SUMMARY OF THE INVENTION

In accordance with a first aspect of the present invention, an operating device for a human-powered vehicle comprises a base structure, a switch unit, an electric component, and an electric-component housing. The base structure is configured to be mounted to the human-powered vehicle. The switch unit is configured to be activated in response to a user input. The electric component is configured to be electrically connected to the switch unit. The electric-component housing is configured to be detachably coupled to the base structure. The electric-component housing is configured to support the electric component such that the electric component is detachably coupled to the base structure via the electric-component housing.

With the operating device according to the first aspect, the electric-component housing allows the electric component to be easily replaced with a different electric component. This enables the operating device to be adapted to a variety of specifications of operating devices.

In accordance with a second aspect of the present invention, an operating device for a human-powered vehicle comprises a base structure, a switch unit, an electric component, and an electric-component housing. The base structure is configured to be mounted to the human-powered vehicle. The switch unit is configured to be activated in response to a user input. The electric component is configured to be electrically connected to the switch unit. The electric-component housing is configured to be detachably coupled to the base structure. The switch unit is configured to be detachably coupled to at least one of the electric-component housing and the base structure.

With the operating device according to the second aspect, it is possible to replace the switch unit to a different switch unit. This enables the operating device to be adapted to a variety of specifications of operating devices.

In accordance with a third aspect of the present invention, the operating device according to the first or second aspect is configured so that the electric component includes at least one of a substrate, a wireless communicator, and a wired communicator.

With the operating device according to the third aspect, it is possible to mount an electric part on the substrate, to wirelessly communicate with another device, and/or to communicate with another device via a wired communication channel.

In accordance with a fourth aspect of the present invention, the operating device according to any one of the first to third aspects is configured so that the electric-component housing includes an accommodating space. The electric component is at least partly provided in the accommodating space.

With the operating device according to the fourth aspect, the electric-component housing can protect the electric component from environments.

In accordance with a fifth aspect of the present invention, the operating device according to the fourth aspect is configured so that the electric component includes a substrate. The substrate is provided in the accommodating space.

With the operating device according to the fifth aspect, the electric-component housing can protect the substrate and an electric part electrically mounted on the substrate from environments.

In accordance with a sixth aspect of the present invention, the operating device according to the fifth aspect is configured so that the electric component includes a wireless communicator. The wireless communicator is electrically mounted on the substrate and is provided in the accommodating space.

With the operating device according to the sixth aspect, the electric-component housing can protect the substrate and the wireless communicator from environments.

In accordance with a seventh aspect of the present invention, the operating device according to any one of the fourth to sixth aspects is configured so that the accommodating space includes a power-supply accommodating space in which a power supply is to be provided.

With the operating device according to the seventh aspect, the power-supply accommodating space enables the operating device to utilize a power supply to supply electricity to the electric component.

In accordance with an eighth aspect of the present invention, the operating device according to the seventh aspect is configured so that the electric component includes a terminal contactable with the power supply in a state where the power supply is provided in the power-supply accommodating space. The terminal is provided in the accommodating space.

With the operating device according to the eighth aspect, the electric-component housing can protect the terminal from environments.

In accordance with a ninth aspect of the present invention, the operating device according to any one of the fourth to eighth aspects is configured so that the electric-component housing includes a housing body. The housing body includes the accommodating space. The housing body is configured to be detachably coupled to the base structure via a housing fastener.

With the operating device according to the ninth aspect, the housing fastener enables the housing body of the electric-component housing to be detachable from and reattachable to the base structure.

In accordance with a tenth aspect of the present invention, the operating device according to the ninth aspect is configured so that the housing fastener is configured to be detachably attached to at least one of the base structure and the housing body.

With the operating device according to the tenth aspect, the housing fastener reliably enables the housing body of the electric-component housing to be detachable from and reattachable to the base structure.

In accordance with an eleventh aspect of the present invention, the operating device according to the ninth or tenth aspect is configured so that the housing fastener includes a tool engagement part with which a tool is to engage.

With the operating device according to the eleventh aspect, the tool engagement part enables the housing body to be detachable from and reattachable to the base structure using a tool.

In accordance with a twelfth aspect of the present invention, the operating device according to any one of the fourth to eleventh aspects is configured so that the base structure includes an attachment opening. At least one of the housing body and the housing fastener is configured to be provided in the attachment opening.

With the operating device according to the twelfth aspect, it is possible to detachably couple at least one of the housing body and the housing fastener to the base structure using the attachment opening.

In accordance with a thirteenth aspect of the present invention, the operating device according to the twelfth aspect is configured so that the attachment opening includes a first attachment opening and a second attachment opening. The housing body is configured to be provided in the first attachment opening. The housing fastener is configured to be provided in the second attachment opening.

With the operating device according to the thirteenth aspect, it is possible to detachably couple the housing body and the housing fastener to the base structure using the first attachment opening and the second attachment opening.

In accordance with a fourteenth aspect of the present invention, the operating device according to the thirteenth aspect is configured so that the first attachment opening is in communication with the second attachment opening.

With the operating device according to the fourteenth aspect, the first attachment opening and the second attachment opening enable the housing body and the housing fastener to be detachably coupled to the base structure with a simple structure.

In accordance with a fifteenth aspect of the present invention, the operating device according to the thirteenth or fourteenth aspect is configured so that the housing body is configured to be inserted into and removed from the first attachment opening in a first direction. The housing fastener is configured to be inserted into and removed from the second attachment opening in a second direction. The first direction is different from the second direction.

With the operating device according to the fifteenth aspect, the first attachment opening and the second attachment opening reliably enable the housing body and the housing fastener to be detachably coupled to the base structure with a simple structure.

In accordance with a sixteenth aspect of the present invention, the operating device according to the fifteenth aspect is configured so that the switch unit is pivotally coupled to the base structure about an attachment axis. At least one of the first direction and the second direction is non-parallel to the attachment axis.

With the operating device according to the sixteenth aspect, the positional relationship between the attachment axis, the first direction, and the second direction can improve flexibility of arrangement of the switch unit, the housing body, and the housing fastener.

In accordance with a seventeenth aspect of the present invention, the operating device according to any one of the first to sixteenth aspects further comprises a mounting structure configured to couple the base structure to the human-powered vehicle.

With the operating device according to the seventeenth aspect, it is possible to mount the operating device to any part of the human-powered vehicle where the user can access the operating device.

In accordance with an eighteenth aspect of the present invention, the operating device according to the seventeenth aspect is configured so that the mounting structure includes a mounting member. The mounting member includes a mounting opening through which a tubular part of the human-powered vehicle extends in a mounting state where the mounting structure couples the base structure to the tubular part of the human-powered vehicle.

With the operating device according to the eighteenth aspect, it is possible to reliably mount the operating device to any part of the human-powered vehicle where the user can access the operating device.

In accordance with a nineteenth aspect of the present invention, the operating device according to the eighteenth aspect is configured so that the mounting structure includes a mounting base and an adjustment member. The mounting base is secured to the base structure. The adjustment member is adjustably attached to the mounting base and is configured to adjustably couple the mounting base to the mounting member.

With the operating device according to the nineteenth aspect, the adjustment member allows the user to change the position of the operating device relative to a part of the human-powered vehicle.

In accordance with a twentieth aspect of the present invention, the operating device according to any one of the first to nineteenth aspects further comprises an additional switch unit and a fastener. The additional switch unit is configured to be activated in response to an additional user input. The fastener is configured to fasten the switch unit and the additional switch unit to the base structure.

With the operating device according to the twentieth aspect, the switch unit and the additional switch unit can be fastened to the base structure using the fastener.

In accordance with a twenty-first aspect of the present invention, the operating device according to any one of the first to twentieth aspects further comprises an additional member configured to be detachably attached to at least one of the base structure and the electric-component housing.

With the operating device according to the twenty-first aspect, it is possible to mount another component to the at least one of the base structure and the electric-component housing using the attachment member.

In accordance with a twenty-second aspect of the present invention, the operating device according to the twenty-first aspect further comprises a third switch unit configured to be activated in response to a third user input. The third switch unit is provided to the additional member.

With the operating device according to the twenty-second aspect, it is possible to mount the third switch unit to the at least one of the base structure and the electric-component housing using the attachment member using the third switch unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
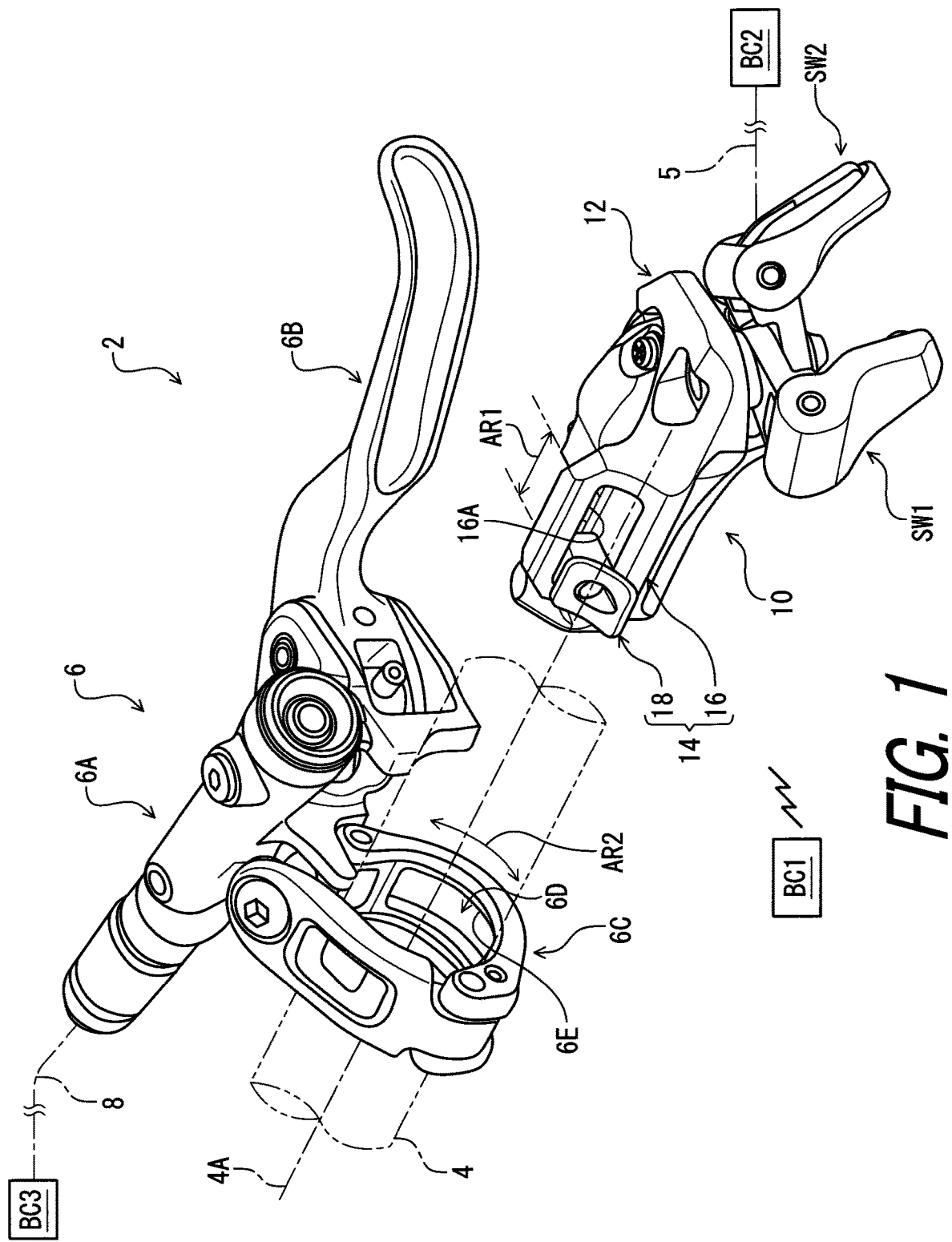
FIG. 1 is a perspective view of an operating device in accordance with a first embodiment and an additional operating device for a human-powered vehicle.

The embodiment(s) will now be described with reference to the accompanying drawings, wherein like reference numerals designate corresponding or identical elements throughout the various drawings.

First Embodiment

As seen in FIG. 1, an operating device 10 for a human-powered vehicle 2 is configured to operate at least one device. The operating device 10 is configured to be mounted to a tubular part 4 of the human-powered vehicle 2. In the present application, a human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The operating device 10 is configured to be electrically connected to an electric device BC1. In the present embodiment, the operating device 10 is configured to be connected to the electric device BC1 via a wireless communication channel. The operating device 10 is configured to be wirelessly connected to the electric device BC1.

The operating device 10 is configured to be electrically connected to an electric device BC2. In the present embodiment, the operating device 10 is configured to be connected to the electric device BC2 via a wired communication channel. The operating device 10 is configured to be connected to the electric device BC2 via an electric cable 5.

Examples of the electric devices BC1 and BC2 include additional or satellite operating device, an adjustable seatpost, a suspension, a gear changing device, a brake device, a lighting device, a display device, a cycle computer, a smartphone, a tablet computer, and a personal computer. In the present embodiment, the electric device BC1 includes a gear changing device such as a derailleur. The electric device BC2 includes a satellite operating device. However, the electric devices BC1 and BC2 are not limited to the above devices.

In the present embodiment, the operating device 10 is a right-hand side operating/control device configured to be operated by the rider's right hand to actuate the electric device BC1 or other devices. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a steering or a handlebar. Accordingly, these terms, as utilized to describe the operating device 10 or other components, should be interpreted relative to the human-powered vehicle 2 equipped with the operating device 10 as used in an upright riding position on a horizontal surface.

The human-powered vehicle 2 includes an additional operating device 6. The additional operating device 6 is configured to operate at least one component. The additional operating device 6 is configured to be mounted to the tubular part 4 of the human-powered vehicle 2. The additional operating device 6 includes an operating body 6A, an operating lever 6B, and a mounting member 6C. The operating lever 6B is pivotally coupled to the operating body 6A. The operating body 6A includes a hydraulic unit configured to generate a hydraulic pressure in response to a movement of the operating lever 6B.

The mounting member 6C is configured to couple the operating body 6A to the tubular part 4 of the human-powered vehicle 2. The mounting member 6C includes a mounting opening 6D through which the tubular part 4 of the human-powered vehicle 2 extends in a state where the mounting member 6C couples the operating body 6A to the tubular part 4 of the human-powered vehicle 2. In the present embodiment, the mounting member 6C includes a clamp. However, the structure of the mounting member 6C is not limited to the clamp.

The additional operating device 6 is configured to be connected to an additional electric device BC3. In the present embodiment, the additional operating device 6 is configured to be connected to the additional electric device BC3 via a hydraulic hose 8. However, the additional operating device 6 can be configured to be connected to the additional electric device BC3 via other elements such as a mechanical cable (e.g., Bowden cable).

Examples of the additional electric device BC3 include an adjustable seatpost, a suspension, a gear changing device, and a brake device. In the present embodiment, the additional electric device BC3 includes a hydraulic brake device. However, the additional electric device BC3 is not limited to the above devices.

As seen in FIG. 1, the operating device 10 for the human-powered vehicle 2 comprises a base structure 12. The base structure 12 is configured to be mounted to the human-powered vehicle 2. The base structure 12 is configured to be mounted to the tubular part 4 of the human-powered vehicle 2. The tubular part 4 has a longitudinal center axis 4A. The tubular part 4 of the human-powered vehicle 2 extends along the longitudinal center axis 4A.

The operating device 10 further comprises a mounting structure 14. The mounting structure 14 is configured to couple the base structure 12 to the human-powered vehicle 2. The mounting structure 14 is configured to couple the base structure 12 to the tubular part 4 of the human-powered vehicle 2. In the present embodiment, the operating device 10 is configured to be mounted to a flat handlebar. However, the mounting structure 14 can be configured to couple the base structure 12 to other type of handlebars such as a drop-down handlebar, a time trial handlebar, and a bull horn handlebar if needed and/or desired.

The mounting structure 14 includes at least one of the mounting member 6C and an adjustment member. In the present embodiment, the mounting structure 14 includes a mounting base 16 and an adjustment member 18. However, the mounting structure 14 can include the mounting member 6C configured to couple the base structure 12 to the tubular part 4 of the human-powered vehicle 2 if needed and/or desired.

As seen in FIG. 1, the mounting base 16 is secured to the base structure 12. The adjustment member 18 is adjustably attached to the mounting base 16 and is configured to adjustably couple the mounting base 16 to the mounting member 6C. In the present embodiment, the mounting structure 14 is configured to couple the base structure 12 to the tubular part 4 of the human-powered vehicle 2 such that the base structure 12 is positioned in any position within an adjustable range AR1. The mounting structure 14 is configured to couple the base structure 12 to the tubular part 4 of the human-powered vehicle 2 such that the base structure 12 is positioned in any position within an additional adjustable range AR2. The mounting structure 14 can be configured to couple the base structure 12 to the tubular part 4 of the human-powered vehicle 2 such that the base structure 12 is positioned in any position within only one of the adjustable range AR1 and the additional adjustable range AR2 if needed and/or desired.

Figure 2:
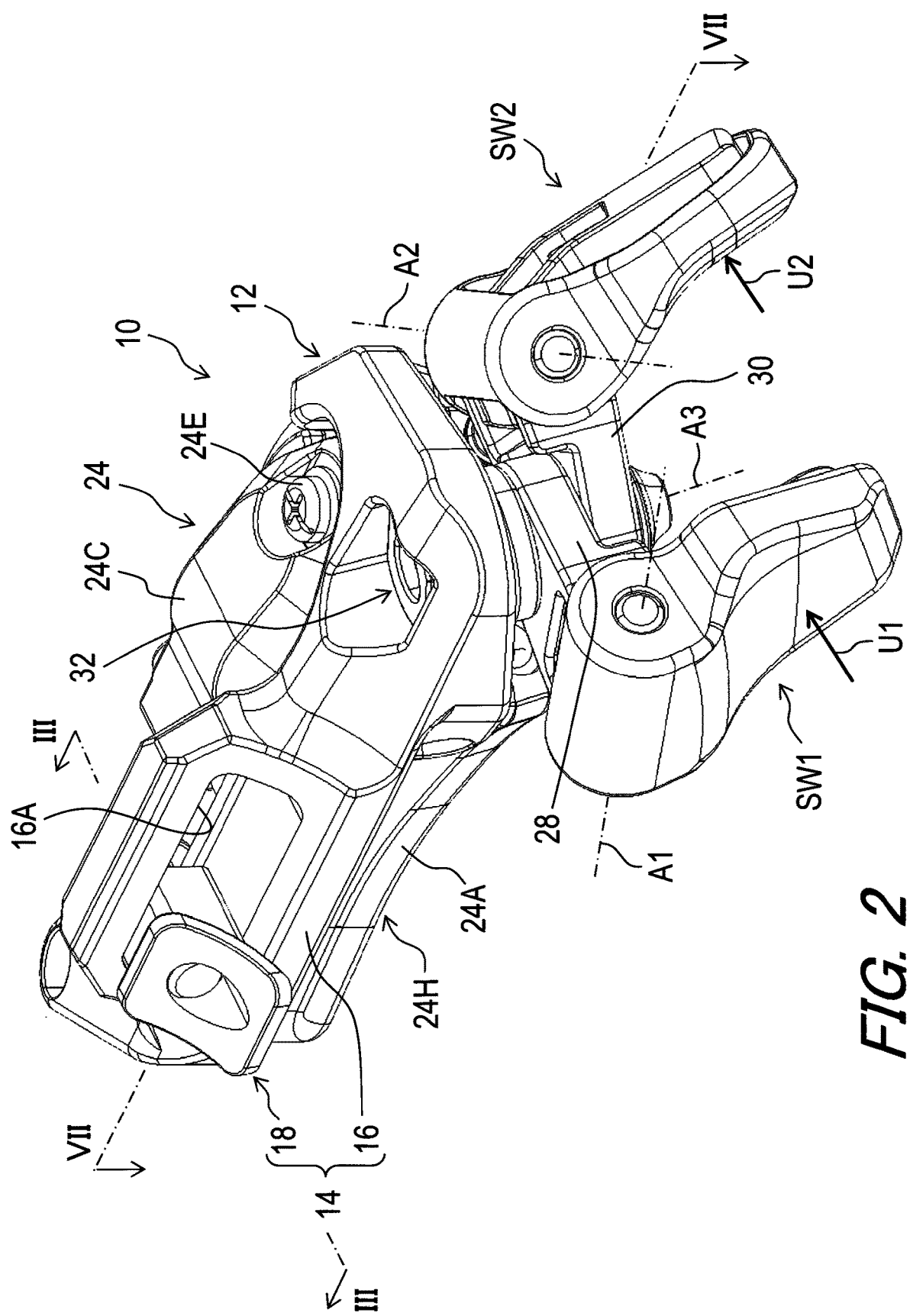
FIG. 2 is a perspective view of the operating device illustrated in FIG. 1.

As seen in FIG. 2, the mounting base 16 is integrally provided with the base structure 12 as a one-piece unitary member. The adjustment member 18 is a separate member from the mounting base 16. The mounting base 16 includes an elongated opening 16A. The adjustment member 18 is movably provided in the elongated opening 16A.

As seen in FIG. 1, the adjustment member 18 extends through the elongated opening 16A in a mounting state where the mounting structure 14 fastens the base structure 12 to the tubular part of the human-powered vehicle 2. The adjustment member 18 is movable relative to the base structure 12 within the elongated opening 16A in a state where the mounting structure 14 does not fasten the base structure 12 to the tubular part 4 of the human-powered vehicle 2. The elongated opening 16A of the mounting base 16 defines the adjustable range AR1. The elongated opening 16A extends along the longitudinal center axis 4A of the tubular part 4 of the human-powered vehicle 2.

As seen in FIG. 1, the mounting member 6C includes an additional elongated opening 6E. The adjustment member 18 is configured to be movably provided in the additional elongated opening 6E. The adjustment member 18 is provided in the elongated opening 16A and the additional elongated opening 6E in the mounting state where the mounting structure 14 couples the base structure 12 to the tubular part 4 of the human-powered vehicle 2. The adjustment member 18 is movable relative to the mounting member 6C of the additional operating device 6 within the additional elongated opening 6E in the state where the mounting structure 14 does not fasten the base structure 12 to the tubular part 4 of the human-powered vehicle 2. The additional elongated opening 6E of the mounting member 6C defines the additional adjustable range AR2. The additional elongated opening 6E extends along an outer peripheral surface of the tubular part 4 of the human-powered vehicle 2 about the longitudinal center axis 4A.

Figure 3:
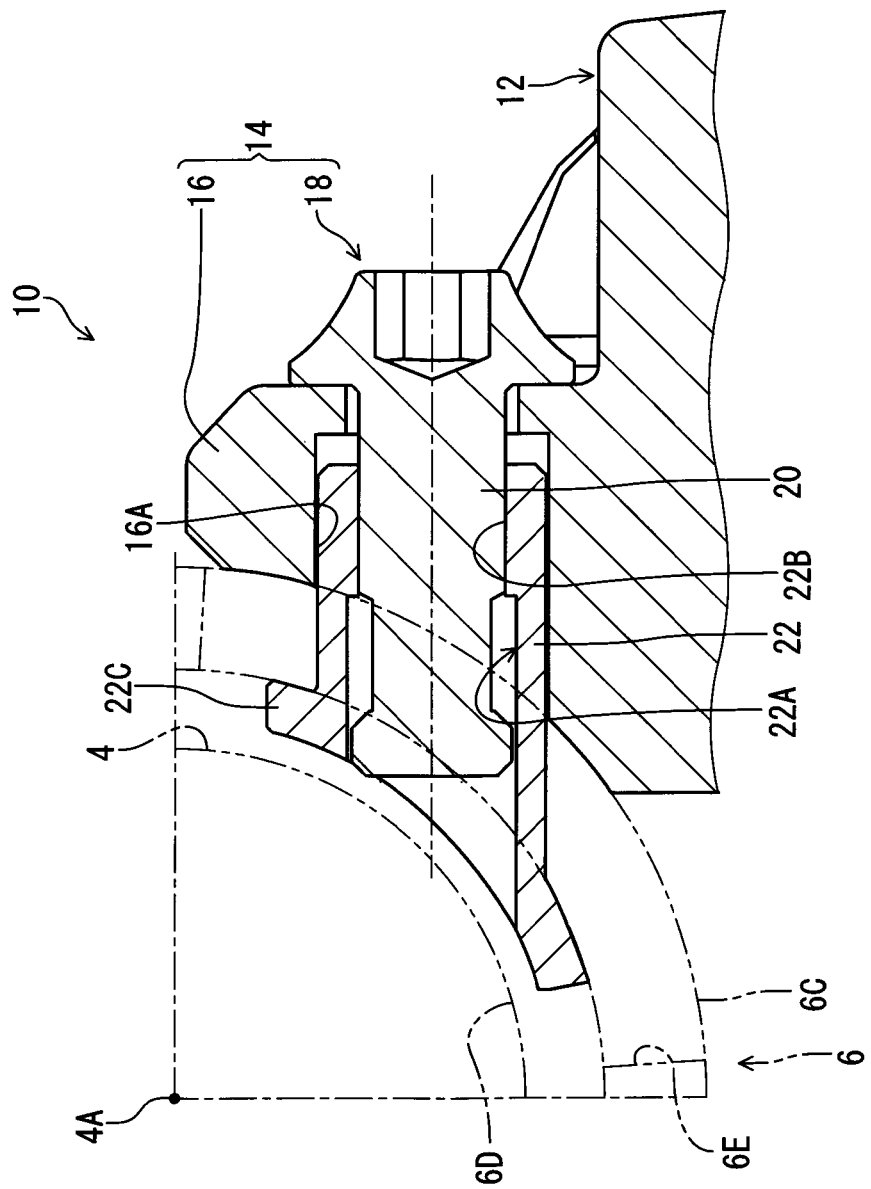
FIG. 3 is a cross-sectional view of the operating device taken along line III-III of FIG. 2.

As seen in FIG. 3, the adjustment member 18 includes an adjustment screw 20 and a holder 22. The holder 22 includes a through hole 22A having a threaded hole 22B. The adjustment screw 20 is threadedly engaged with the threaded hole 22B of the holder 22. The holder 22 includes a flange part 22C. The mounting member 6C of the additional operating device 6 is held between the mounting base 16 and the flange part 22C of the holder 22. However, the structure of the adjustment member 18 is not limited to the illustrated structure.

Figure 4:
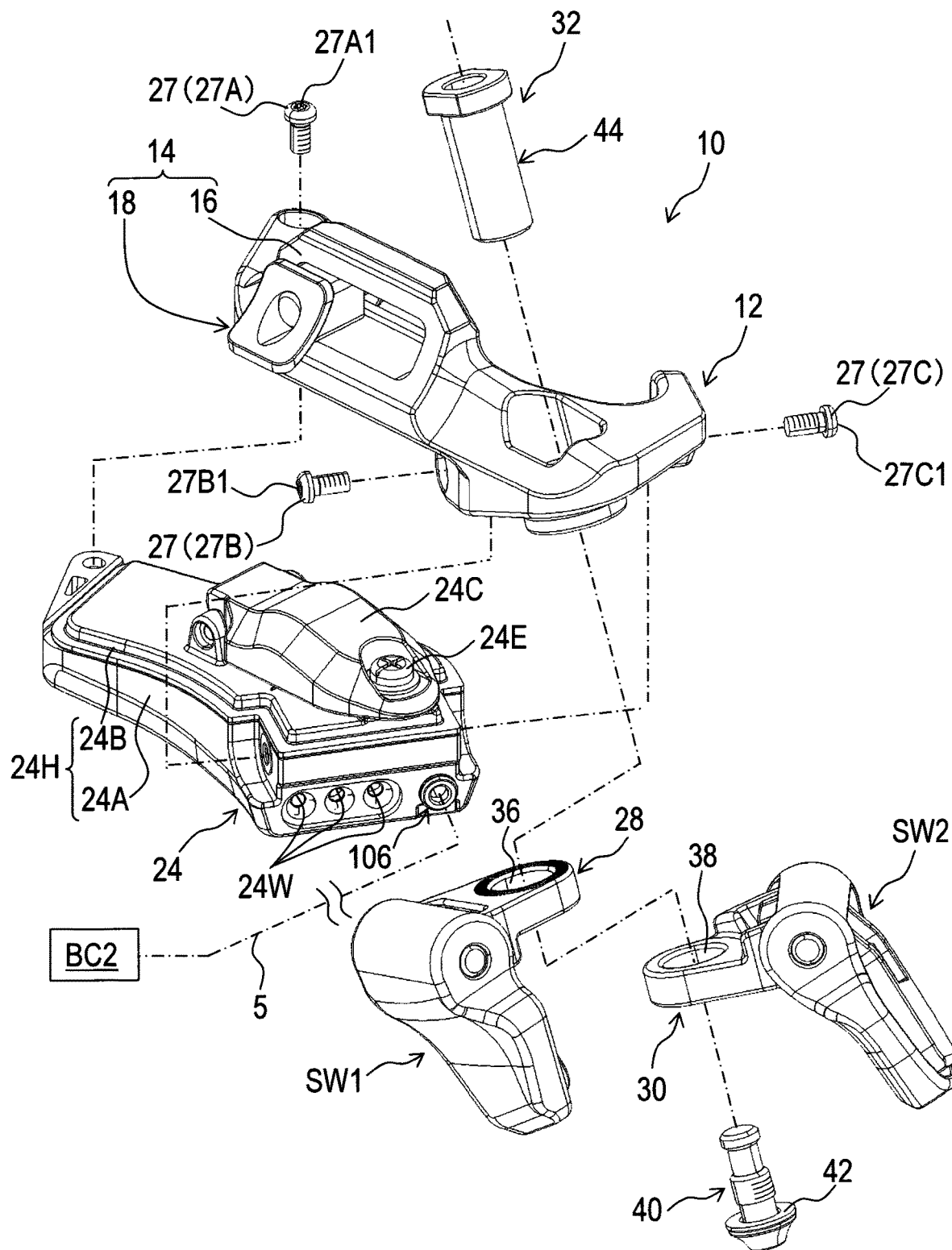
FIG. 4 is an exploded perspective view of the operating device illustrated in FIG. 2.

As seen in FIG. 4, the operating device 10 for the human-powered vehicle 2 comprises a switch unit SW1. The switch unit SW1 is configured to be activated in response to a user input U1. The operating device 10 further comprises an additional switch unit SW2. The additional switch unit SW2 is configured to be activated in response to an additional user input U2. The switch unit SW1 can also be referred to as a first or second switch unit SW1. The additional switch unit SW2 can also be referred to as a second or first switch unit SW2.

The operating device 10 for the human-powered vehicle 2 comprises an electric-component housing 24. The electric-component housing 24 is configured to be detachably coupled to the base structure 12. The electric-component housing 24 is configured to be detachably and reattachably coupled to the base structure 12.

The terms "detachable and/or reattachable" and/or "detachably and/or reattachably" as used herein, encompasses a configuration in which an element is repeatedly detachable from and attachable to another element without substantial damage.

The switch unit SW1 is configured to be detachably coupled to at least one of the electric-component housing 24 and the base structure 12. The switch unit SW1 is configured to be detachably and reattachably coupled to at least one of the electric-component housing 24 and the base structure 12. In the present embodiment, the switch unit SW1 is configured to be detachably and reattachably coupled to the base structure 12. However, the switch unit SW1 can be configured to be detachably and reattachably coupled to the electric-component housing 24 or both the electric-component housing 24 and the base structure 12 if needed and/or desired.

The additional switch unit SW2 is configured to be detachably coupled to at least one of the electric-component housing 24 and the base structure 12. The additional switch unit SW2 is configured to be detachably and reattachably coupled to at least one of the electric-component housing 24 and the base structure 12. In the present embodiment, the additional switch unit SW2 is configured to be detachably and reattachably coupled to the base structure 12. However, the additional switch unit SW2 can be configured to be detachably and reattachably coupled to the electric-component housing 24 or both the electric-component housing 24 and the base structure 12 if needed and/or desired.

Figure 5:
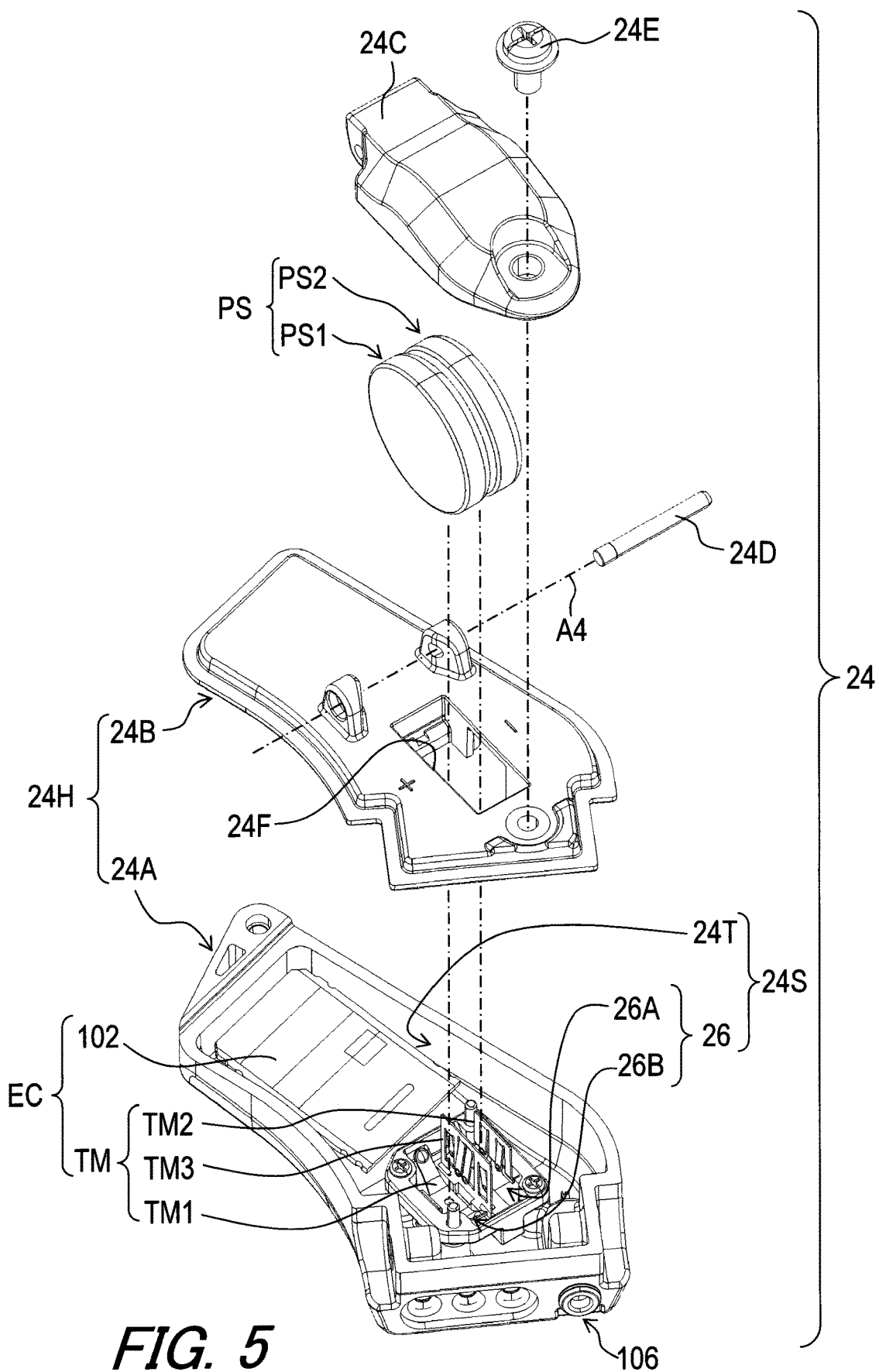
FIG. 5 is an exploded perspective view of an electric-component housing of the operating device illustrated in FIG. 2.

As seen in FIG. 5, the operating device 10 for the human-powered vehicle 2 comprises an electric component EC. The electric component EC is configured to be electrically connected to the switch unit SW1. The electric component EC is configured to be electrically connected to the additional switch unit SW2.

The electric-component housing 24 is configured to support the electric component EC such that the electric component EC is detachably coupled to the base structure 12 (see e.g., FIG. 4) via the electric-component housing 24. The electric-component housing 24 is configured to support the electric component EC such that the electric component EC is detachably and reattachably coupled to the base structure 12 (see e.g., FIG. 4) via the electric-component housing 24.

The electric-component housing 24 includes an accommodating space 24S. The electric component EC is at least partly provided in the accommodating space 24S. In the present embodiment, the electric component EC is entirely provided in the accommodating space 24S. However, the electric component EC can be partly provided in the accommodating space 24S if needed and/or desired.

The electric-component housing 24 includes a housing body 24H. The housing body 24H includes the accommodating space 24S. The accommodating space 24S includes an electric-component accommodating space 24T. housing body 24H includes the electric-component accommodating space 24T. The housing body 24H includes a first housing 24A and a second housing 24B. The second housing 24B is detachably and reattachably coupled to the first housing 24A. The first housing 24A and the second housing 24B define the electric-component accommodating space 24T.

The electric-component housing 24 includes a lid 24C, a lid pin 24D, and a lid fastener 24E. The lid 24C is pivotally coupled to the housing body 24H about a lid pivot axis A4. The lid pin 24D pivotally couples the lid 24C to the housing body 24H about the lid pivot axis A4. The lid fastener 24E is configured to fasten the lid 24C to the housing body 24H.

The accommodating space 24S includes a power-supply accommodating space 26 in which a power supply PS is to be provided. The power supply PS includes a first power supply PS1 and a second power supply PS2. The first power supply PS1 is a separate member from the second power supply PS2. The power-supply accommodating space 26 includes a first power-supply accommodating space 26A in which a first power supply PS1 is to be provided. The power-supply accommodating space 26 includes a second power-supply accommodating space 26B in which a second power supply PS2 is to be provided.

In the present embodiment, the power-supply accommodating space 26 is in communication with the electric-component accommodating space 24T. However, the power-supply accommodating space 26 can be configured to not be in communication with the electric-component accommodating space 24T if needed and/or desired.

The housing body 24H includes an insertion opening 24F into which a power supply PS is to be inserted. The first power supply PS1 is provided in the insertion opening 24F in a state where the first power supply PS1 is provided in the first power-supply accommodating space 26A. The first power supply PS1 is inserted into the insertion opening 24F when the first power supply PS1 is inserted into the first power-supply accommodating space 26A. The second power supply PS2 is provided in the insertion opening 24F in a state where the second power supply PS2 is provided in the second power-supply accommodating space 26B. The second power supply PS2 is inserted into the insertion opening 24F when the second power supply PS2 is inserted into the second power-supply accommodating space 26B.

The power supply PS can include only one power supply or three or more power supplies if needed and/or desired. The power-supply accommodating space 26 can include only one of the first power-supply accommodating space 26A and the second power-supply accommodating space 26B or another power-supply accommodating space in addition to the first power-supply accommodating space 26A and the second power-supply accommodating space 26B.

The electric component EC includes a terminal TM. The terminal TM is contactable with the power supply PS in a state where the power supply PS is provided in the power-supply accommodating space 26. The terminal TM is provided in the accommodating space 24S.

The terminal TM includes a first terminal TM1, a second terminal TM2, and an intermediate terminal TM3. The first terminal TM1, the second terminal TM2, and the intermediate terminal TM3 are provided in the accommodating space 24S. The first power-supply accommodating space 26A is provided between the first terminal TM1 and the intermediate terminal TM3. The second power-supply accommodating space 26B is provided between the second terminal TM2 and the intermediate terminal TM3.

As seen in FIG. 4, the electric-component housing 24 includes a housing fastener 27. The housing body 24H is configured to be detachably coupled to the base structure 12 via the housing fastener 27. In the present embodiment, the housing fastener 27 includes a plurality of housing fasteners 27A, 27B, and 27C. The housing body 24H is configured to be detachably coupled to the base structure 12 via the housing fasteners 27A, 27B, and 27C.

The housing fastener 27 is configured to be detachably attached to at least one of the base structure 12 and the housing body 24H. The housing fastener 27 is configured to be detachably and reattachably attached to the housing body 24H and is configured to extend through a through-hole of the base structure 12. The housing fastener 27A is configured to be detachably and reattachably attached to the housing body 24H. The housing fastener 27B is configured to be detachably and reattachably attached to the housing body 24H. The housing fastener 27C is configured to be detachably and reattachably attached to the housing body 24H.

The housing fastener 27 includes a tool engagement part with which a tool is to engage. The housing fastener 27A includes a tool engagement part 27A1 with which a tool is to engage. The housing fastener 27B includes a tool engagement part 27B1 with which a tool is to engage. The housing fastener 27C includes a tool engagement part 27C1 with which a tool is to engage. The housing fasteners 27A, 27B, and 27C each include a screw. The tool engagement parts 27A1, 27B1, and 27C1 each include a tool engagement recess. However, the tool engagement part of the housing fastener 27 can be omitted from the housing fastener 27 if needed and/or desired. The housing fastener 27 can be omitted from the electric-component housing 24 if needed and/or desired.

Figure 6:
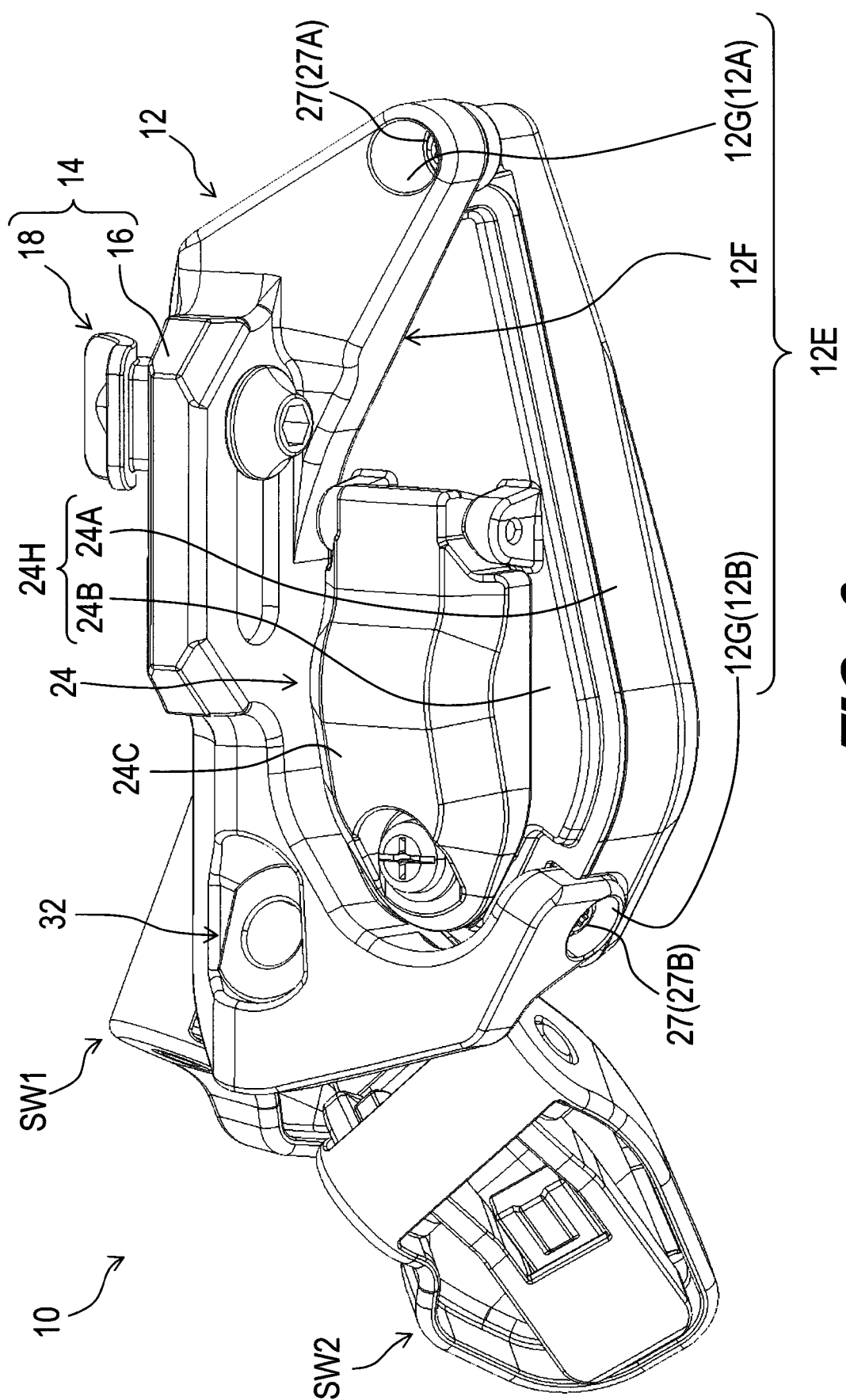
FIG. 6 is a perspective view of the operating device illustrated in FIG. 2.

As seen in FIG. 6, the base structure 12 includes an attachment opening 12E. At least one of the housing body 24H and the housing fastener 27 is configured to be provided in the attachment opening 12E. In the present embodiment, the housing body 24H and the housing fastener 27 are configured to be provided in the attachment opening 12E.

Figure 7:
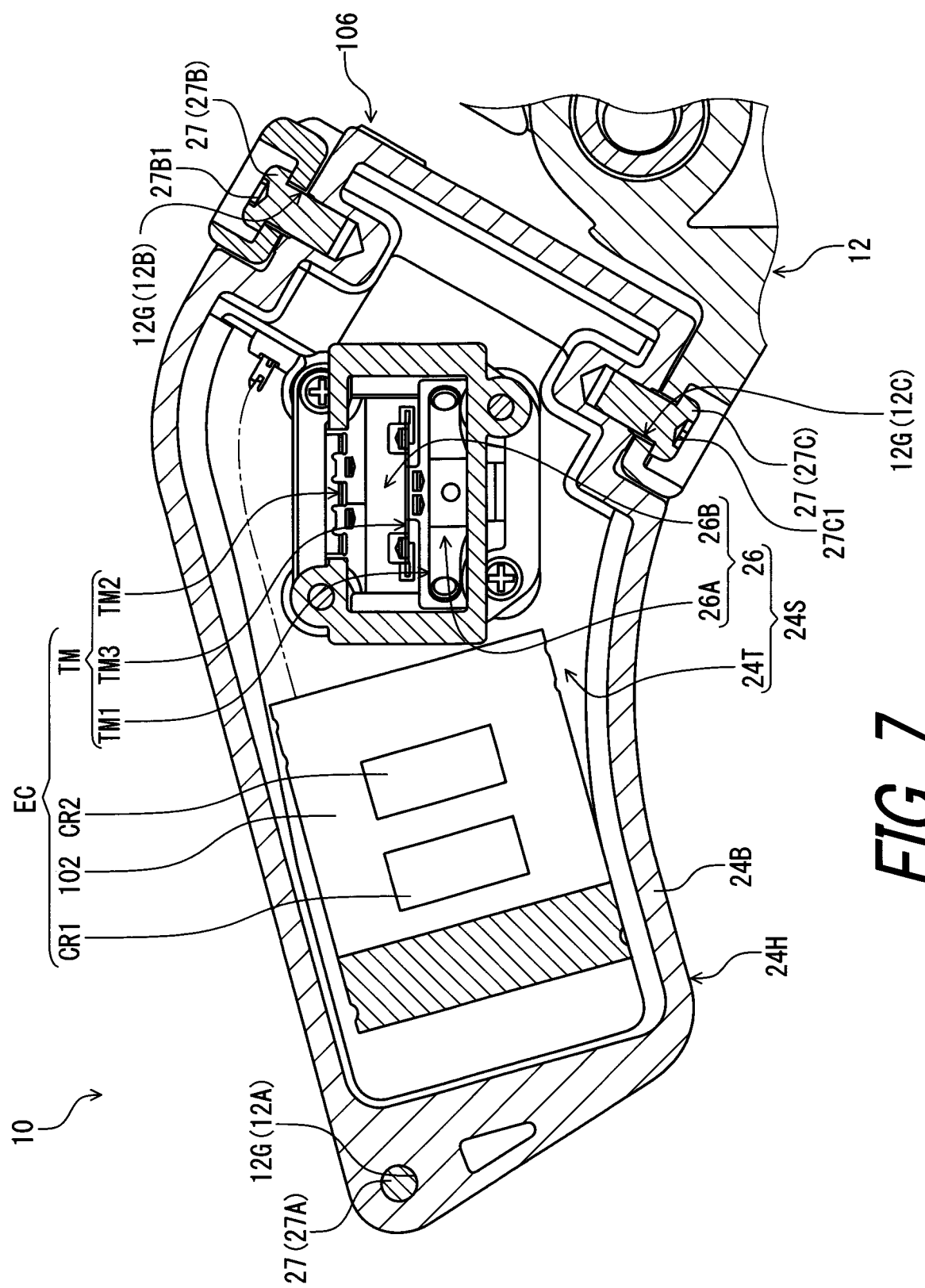
FIG. 7 is a cross-sectional view of the operating device taken along line VII-VII of FIG. 2.

As seen in FIGS. 6 and 7, the attachment opening 12E includes a second attachment opening 12G. The first attachment opening 12F is not in communication with the second attachment opening 12G. The housing body 24H is configured to be provided in the first attachment opening 12F. The housing fastener 27 is configured to be provided in the second attachment opening 12G. The second attachment opening 12G includes a plurality of second attachment openings 12A, 12B, and 12C. The housing fastener 27A is configured to be provided in the second attachment opening 12A. The housing fastener 27B is configured to be provided in the second attachment opening 12B. The housing fastener 27C is configured to be provided in the second attachment opening 12C.

Figure 8:
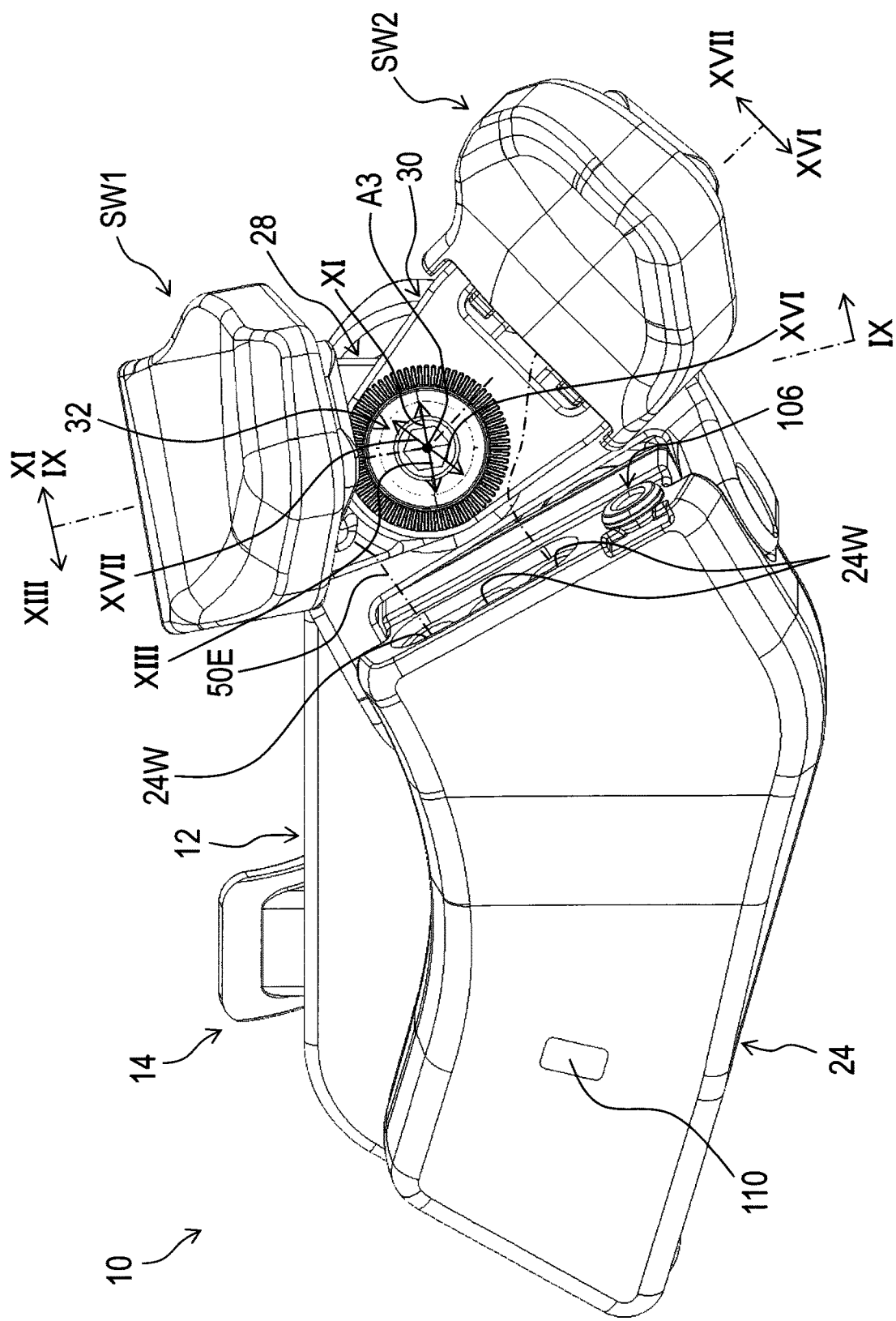
FIG. 8 is a bottom view of the operating device illustrated in FIG. 2.

As seen in FIG. 8, the switch unit SW1 and the additional switch unit SW2 are coupled to the base structure 12 at an attachment axis A3. In the present embodiment, the switch unit SW1 includes a base member 28. The additional switch unit SW2 includes an additional base member 30. The base member 28 and the additional base member 30 are coupled to the base structure 12 at the attachment axis A3. The base member 28 is configured to be detachably and reattachably coupled to the base structure 12. The additional base member 30 is configured to be detachably and reattachably coupled to the base structure 12.

The switch unit SW1 and the additional switch unit SW2 are coupled to the base structure 12 such that at least one of the switch unit SW1 and the additional switch unit SW2 are adjustable about the attachment axis A3. The base member 28 and the additional base member 30 are coupled to the base structure 12 such that at least one of the switch unit SW1 and the additional switch unit SW2 are adjustable about the attachment axis A3.

In the present embodiment, the switch unit SW1 and the additional switch unit SW2 are coupled to the base structure 12 such that the switch unit SW1 and the additional switch unit SW2 are adjustable about the attachment axis A3. The base member 28 is configured to be adjustably coupled to the base structure 12 of the operating device 10. The additional base member 30 is configured to be adjustably coupled to the base structure 12 of the operating device 10. The switch unit SW1 is configured to be coupled to the base structure 12 such that the switch unit SW1 is positioned relative to the base structure 12 at each of at least two circumferential positions about the attachment axis A3. The additional switch unit SW2 is configured to be coupled to the base structure 12 such that the additional switch unit SW2 is positioned relative to the base structure 12 at each of at least two circumferential positions about the attachment axis A3. However, the switch unit SW1 and the additional switch unit SW2 can be coupled to the base structure 12 such that only one of the switch unit SW1 and the additional switch unit SW2 is adjustable about the attachment axis A3 if needed and/or desired. The base member 28 and the additional base member 30 can be coupled to the base structure 12 such that only one of the switch unit SW1 and the additional switch unit SW2 are adjustable about the attachment axis A3 if needed and/or desired.

The switch unit SW1 is pivotally coupled to the base structure 12 about the attachment axis A3. The additional switch unit SW2 is pivotally coupled to the base structure 12 about the attachment axis A3. The base member 28 is pivotally coupled to the base structure 12 about the attachment axis A3. The additional base member 30 is pivotally coupled to the base structure 12 about the attachment axis A3.

Figure 9:
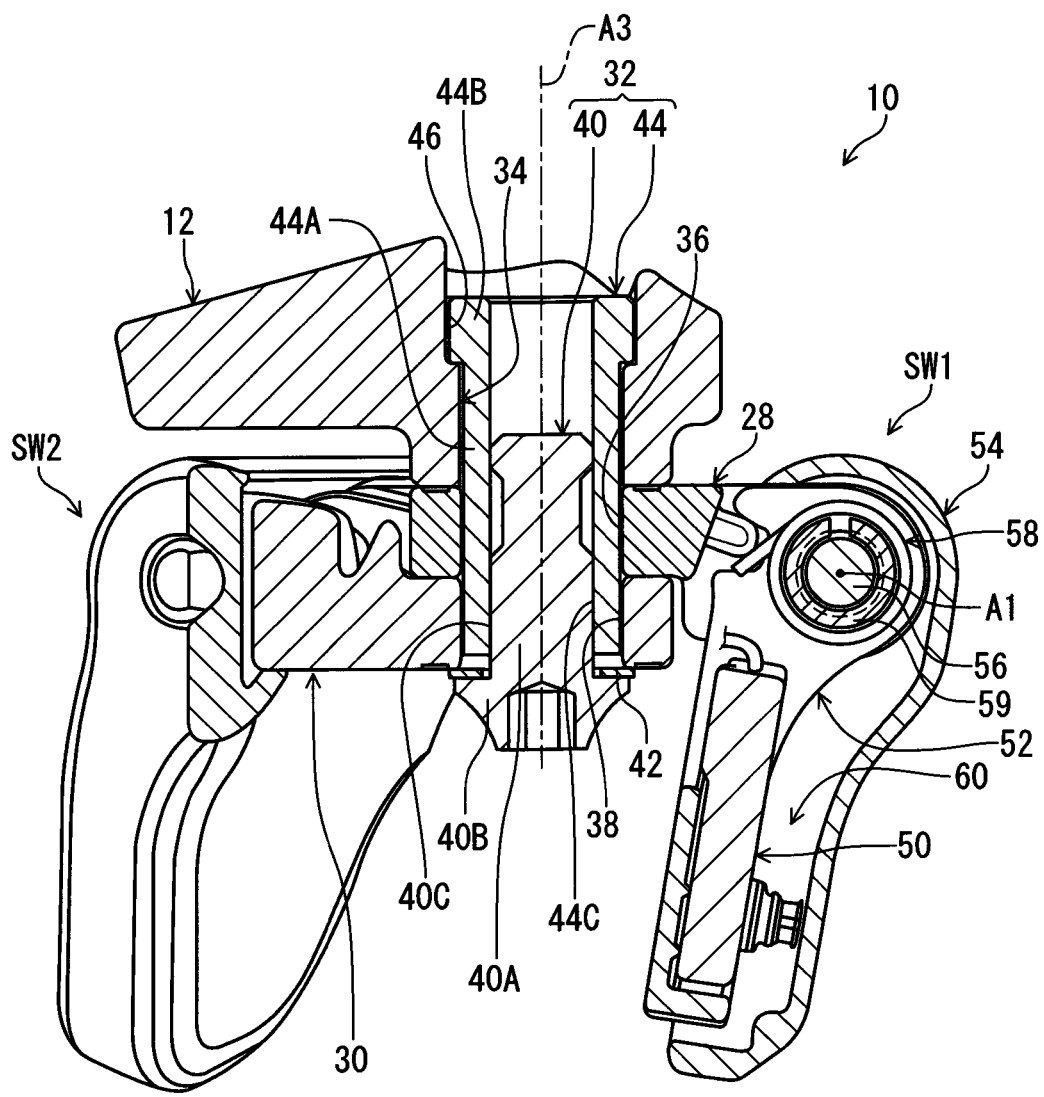
FIG. 9 is a cross-sectional view of the operating device taken along line IX-IX of FIG. 8.

As seen in FIG. 9, the operating device 10 further comprises a fastener 32. The fastener 32 is configured to fasten at least one of the switch unit SW1 and the additional switch unit SW2 to the base structure 12. The fastener 32 is configured to fasten at least one of the base member 28 and the additional base member 30 to the base structure 12. In the present embodiment, the fastener 32 is configured to fasten the switch unit SW1 and the additional switch unit SW2 to the base structure 12. The fastener 32 is configured to fasten the base member 28 and the additional base member 30 to the base structure 12. The fastener 32 defines the attachment axis A3. The fastener 32 extends along the attachment axis A3.

The base structure 12 includes a fastener hole 34. The base member 28 includes a first opening 36. The additional base member 30 includes a second opening 38. The fastener 32 extends through the first opening 36 and the second opening 38 in a fastening state where the fastener 32 fastens the base member 28 and the additional base member 30 to the base structure 12. The fastener 32 extends through the fastener hole 34, the first opening 36, and the second opening 38 in the fastening state.

One of the base member 28 and the additional base member 30 is held between the base structure 12 and the other of the base member 28 and the additional base member 30 in the fastening state. In the present embodiment, the base member 28 is held between the base structure 12 and the additional base member 30 in the fastening state. However, the additional base member 30 is held between the base structure 12 and the base member 28 in the fastening state.

The fastener 32 includes a fastener screw 40, a washer 42, and a fastener pin 44. The fastener screw 40 extends along the attachment axis A3. The fastener pin 44 extends along the attachment axis A3. The fastener screw 40 includes a rod 40A, a head 40B, and an externally threaded part 40C. The rod 40A extends along the attachment axis A3. The head 40B is provided at an end of the rod 40A. The externally threaded part 40C is provided on an outer peripheral surface of the rod 40A. The washer 42 is held between the head 40B of the fastener screw 40 and the additional base member 30.

The fastener pin 44 includes a pin body 44A and a flange 44B. The pin body 44A extends along the attachment axis A3. The flange 44B is provided at an end of the pin body 44A. The fastener pin 44 extends through the fastener hole 34, the first opening 36, and the second opening 38 in the fastening state. The pin body 44A includes a threaded hole 44C. The externally threaded part 40C of the fastener screw 40 is configured to be threadedly engaged with the threaded hole 44C.

The base structure 12 includes a fastener recess 46 provided at an end of the fastener hole 34. The flange 44B of the fastener pin 44 is provided in the fastener recess 46 in the fastening state. The base structure 12, the base member 28, and the additional base member 30 are held between the head 40B of the fastener screw 40 and the flange 44B of the fastener pin 44.

The fastener 32 is a separate member from the base member 28 and the additional base member 30. The fastener screw 40 is a separate member from the fastener pin 44. However, the fastener 32 can be integrally provided with one of the base member 28 and the additional base member 30 as a one-piece unitary member if needed and/or desired. In such an embodiment, the fastener 32 can be provided as a rivet. The fastener pin 44 can be omitted from the fastener 32 if needed and/or desired. In such an embodiment, the fastener screw 40 can be threadedly engaged with a threaded hole of the base structure 12. The fastener 32 can be omitted from the operating device 10 if needed and/or desired.

Figure 10:
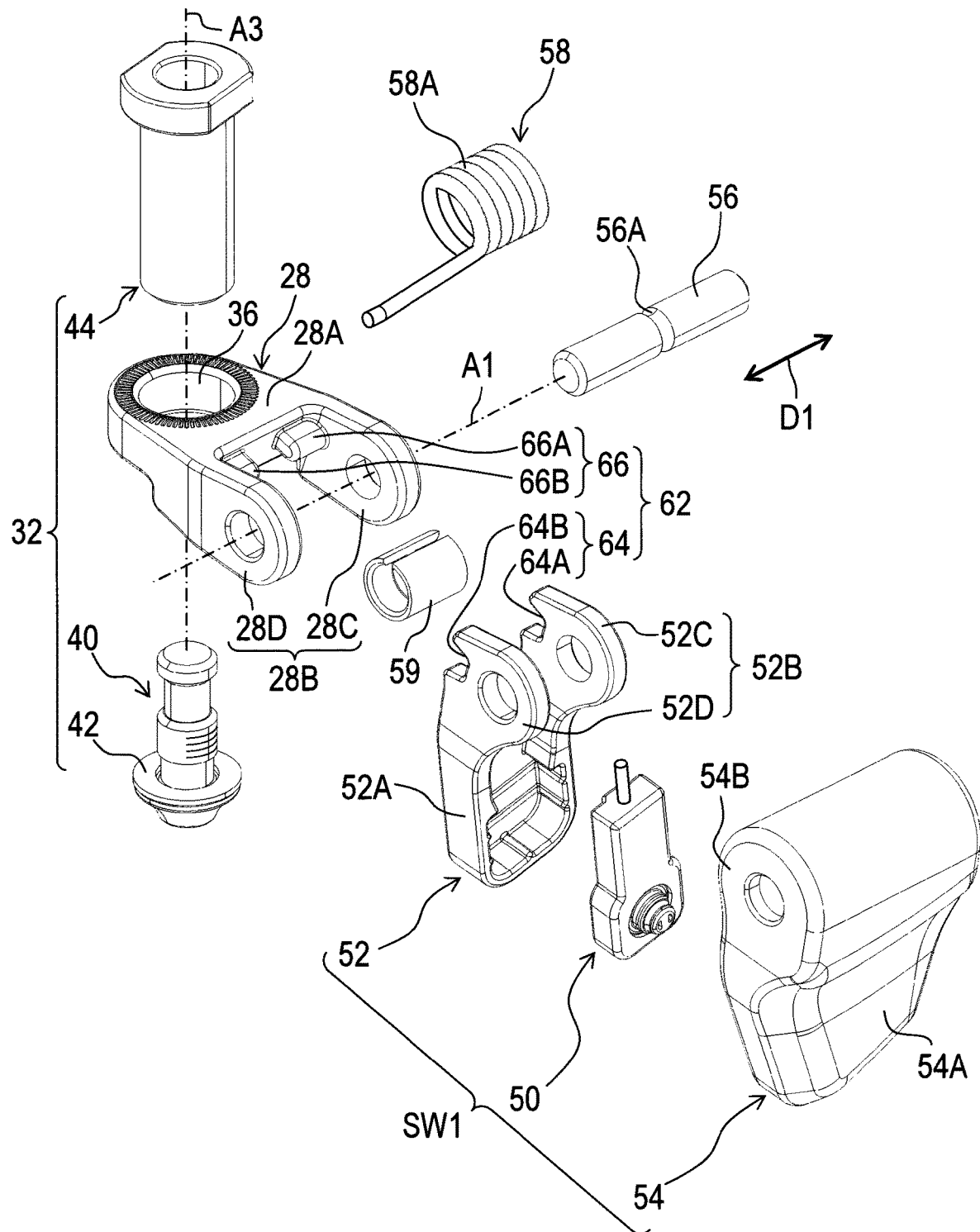
FIG. 10 is an exploded perspective view of a switch unit of the operating device illustrated in FIG. 2.

As seen in FIG. 10, the switch unit SW1 includes a switch 50. The switch 50 is configured to be activated in response to the user input U1. The switch 50 is mounted to the base member 28. The switch unit SW1 includes a switch base 52. The switch base 52 is pivotally coupled to the base member 28 about a pivot axis A1. The switch 50 is mounted to the switch base 52. The switch unit SW1 includes a switch cover 54. The switch cover 54 is configured to be attached to the switch base 52.

The switch unit SW1 further comprises a pivot pin 56. The pivot pin 56 is configured to pivotally couple the switch base 52 to the base member 28 about the pivot axis A1. The switch unit SW1 further comprises a biasing member 58. The biasing member 58 is provided about the pivot pin 56. The biasing member 58 includes a coiled part 58A. The pivot pin 56 extends through the coiled part 58A along the pivot axis A1. The switch unit SW1 includes a bush 59. The pivot pin 56 extends through the bush 59. The pivot pin 56 includes a groove 56A. The bush 59 is partially fitted in the groove 56A of the pivot pin 56. The bush 59 is configured to restrict the pivot pin 56 from moving relative to the base member 28 and the switch base 52 in an axial direction D1 with respect to the pivot axis A1. The bush 59 is provided in the coiled part 58A to support the biasing member 58 about the pivot axis A1.

Figure 11:
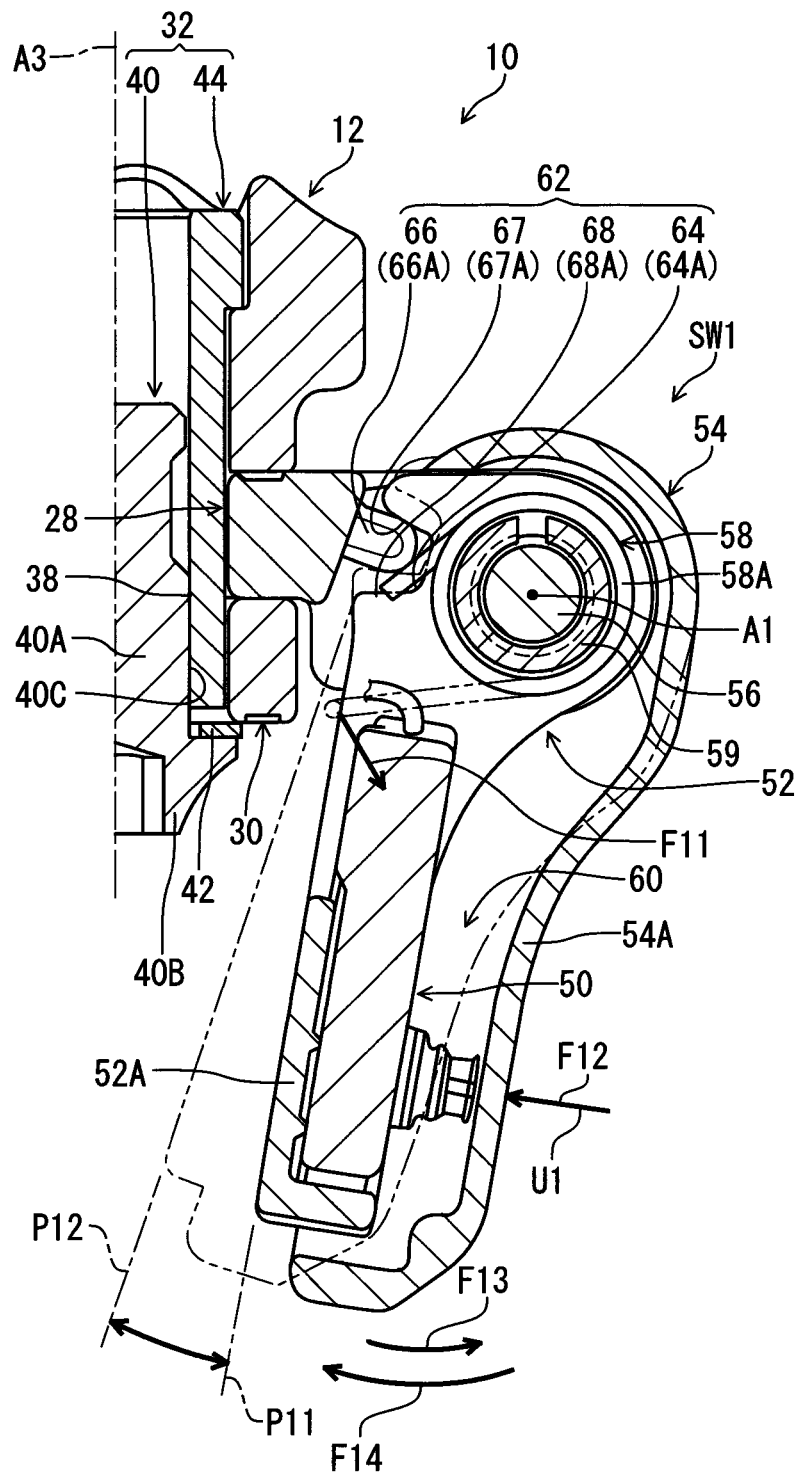
FIG. 11 is a cross-sectional view of the switch unit of the operating device taken along line XI-XI of FIG. 8.

As seen in FIG. 11, the switch cover 54 is configured to be attached to the switch base 52 to define an internal space 60 between the switch base 52 and the switch cover 54. The switch 50 is provided in the internal space 60. The biasing member 58 is provided in the internal space 60. However, at least one of the switch 50 and the biasing member 58 can be at least partially provided outside the internal space 60 if needed and/or desired.

The switch cover 54 is a separate member from the switch base 52. The switch cover 54 is pivotable relative to the base member 28. In the present embodiment, the switch base 52 is made of a first material. The switch cover 54 is made of a second material different from the first material. The first material includes a resin material. The second material includes an elastic material. Examples of the elastic material include elastomer such as rubber. However, the first material and the second material are not limited to the above materials.

The switch base 52 and the switch 50 are pivotable relative to the base member 28 about the pivot axis A1 between a rest position P11 in which the switch 50 does not receive the user input U1 and an operated position P12 in which the switch 50 is activated in response to the user input U1. The switch base 52, the switch 50, and the switch cover 54 are pivotable relative to the base member 28 about the pivot axis A1 between the rest position P11 and the operated position P12.

In the present application, the term "rest position" as used herein refers to a position at which a movable part such as the switch base 52 remains stationary in a state where the movable part is not operated by the user. The term "operated position" as used herein refers to a position at which the movable part has been operated by the user to perform the operation of the bicycle component.

The biasing member 58 is configured to apply a biasing force F11 to the switch base 52 to move relative to the base member 28 from the operated position P12 to the rest position P11. The switch 50 is configured to be activated h response to an operating state in which an operating force F12 applied to the switch 50 as the user input U1 is larger than the biasing force F11. For example, the biasing force F11 generates a biasing rotational force F13 about the pivot axis A1. The operating force F12 generates an operating rotational force F14 about the pivot axis A1. The operating rotational force F14 is larger than the biasing rotational force F13. Thus, the biasing member 58 is configured to allow the switch base 52 to pivot relative to the base member 28 about the pivot axis A1 from the rest position P11 toward the operated position P12 in response to the operating force F12 applied to the switch 50 without activating the switch 50. The switch unit SW1 is configured to pivot about the pivot axis A1 from the rest position P11 to the operated position P12 in response to the operating force F12. The switch 50 is configured to not be activated in response to the operating force F12 in a state where the switch base 52 is in a position other than the operated position P12. The switch unit SW1 receives the operating force F12 without pivoting relative to the base member 28 in an operated state where the switch unit SW1 is in the operated position P12. Thus, the switch 50 is configured to be activated in response to the operating force F12 in an operated state where the switch base 52 is in the operated position P12.

Figure 12:
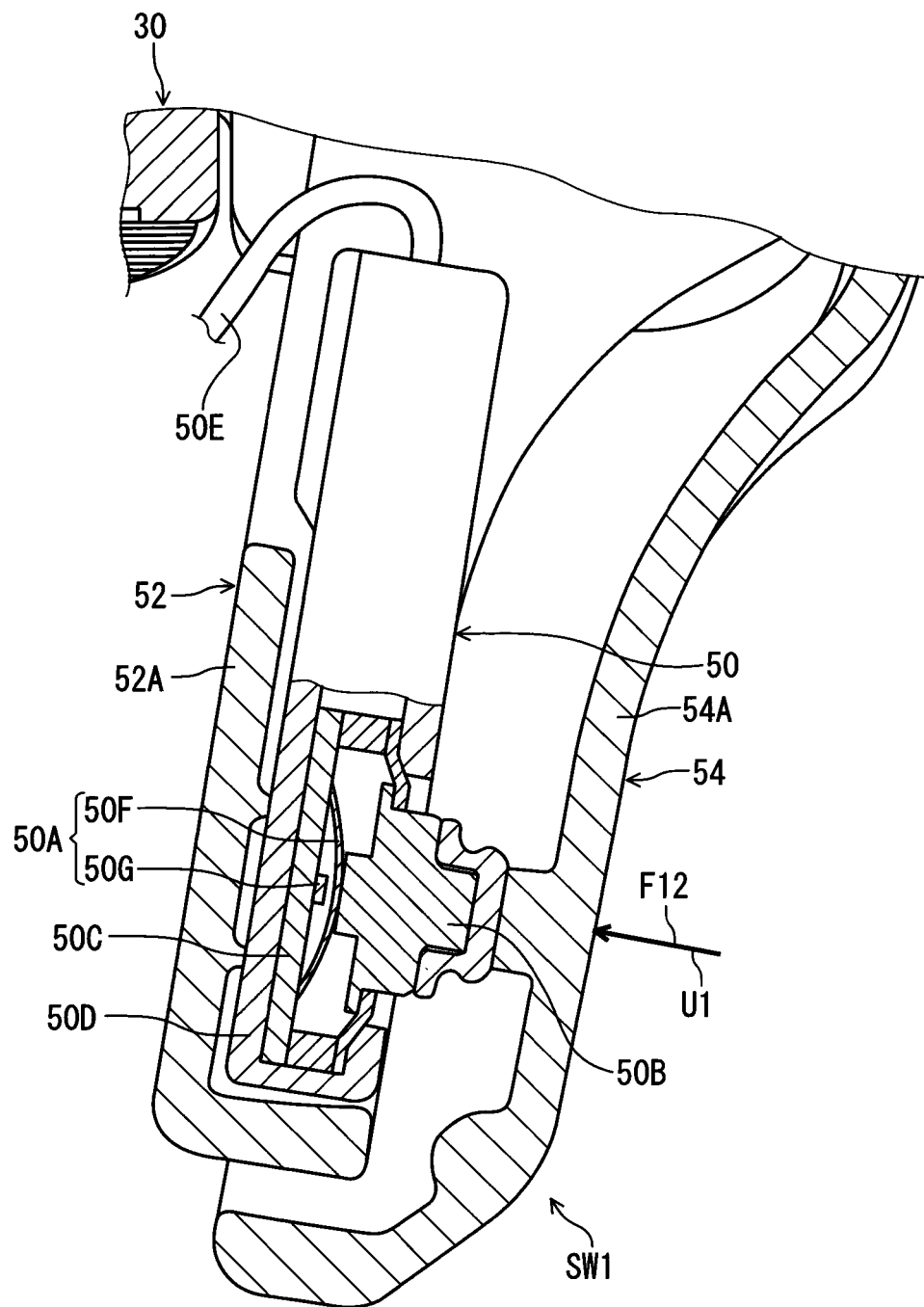
FIG. 12 is an enlarged cross-sectional view of the switch unit of the operating device illustrated in FIG. 2.

As seen in FIG. 12, the switch 50 includes a switch circuit 50A, a button 50B, a base 50C, a casing 50D, and a wire 50E. The switch circuit 50A and the base 50C are provided in the casing 50D. The switch circuit 50A includes a movable contact 50F and a stationary contact 50G. The stationary contact 50G is provided on the base 50C. The movable contact 50F is elastically deformable and is provided on the base 50C. The movable contact 50F is contactable with the stationary contact 50G. The button 50B is movably attached to the base 50C. The button 50B is configured to transmit the operating force F12 to the movable contact 50F of the switch circuit 50A. The button 50B is movable relative to the base 50C in response to the operating force F12. The movable contact 50F and the stationary contact 50G are electrically connected with the wire 50E. As seen in FIG. 8, the wire 50E extends through a hole 24W of the electric-component housing 24.

As seen in FIG. 12, the movable contact 50F is not in contact with the stationary contact 50G in a state where the button 50B does not receive the operating force F12. The movable contact 50F is elastically deformed to come into contact with the stationary contact 50G when the button 50B transmits the operating force F12 to the movable contact 50F. Thus, the operating force F12 has an amount of force which is necessary to bring the movable contact 50F into contact with the stationary contact 50G to turn on the switch.

As seen in FIG. 10, the switch cover 54 includes a cover body 54A and a cover coupling part 54B extending from the cover body 54A. The cover coupling part 54B is configured to be pivotally coupled to the base member 28 about the pivot axis A1. As seen in FIG. 11, the internal space 60 is provided between the switch base 52 and the cover body 54A.

As seen in FIG. 10, the switch unit SW1 further comprises a stopper 62. The stopper 62 is configured to restrict a pivotal movement of the switch base 52 between the rest position P11 and the operated position P12. The stopper 62 includes a recess 64 and a projection 66 provided in the recess 64. The recess 64 is provided to one of the base member 28 and the switch base 52. The projection 66 is provided to the other of the base member 28 and the switch base 52.

In the present embodiment, the recess 64 is provided to the switch base 52. The projection 66 is provided to the base member 28. However, the recess 64 can be provided to the base member 28 if needed and/or desired. The projection 66 can be provided to the switch base 52 if needed and/or desired.

The recess 64 includes a first recess 64A and a second recess 64B. The projection 66 includes a first projection 66A and a second projection 66B. The first recess 64A and the second recess 64B are provided to one of the base member 28 and the switch base 52. The first projection 66A and the second projection 66B are provided to the other of the base member 28 and the switch base 52.

The first recess 64A and the second recess 64B are provided to the switch base 52. The first projection 66A and the second projection 66B are provided to the base member 28. The first projection 66A is provided in the first recess 64A. The second projection 66B is provided in the second recess 64B.

As seen in FIG. 11, the stopper 62 includes a rest-position surface 67 and an operated-position surface 68. The recess 64 is defined between the rest-position surface 67 and the operated-position surface 68. The projection 66 is in contact with the rest-position surface 67 in a rest state where the switch base 52 is provided in the rest position P11. The projection 66 is in contact with the operated-position surface 68 in an operated state where the switch base 52 is provided in the operated position P12.

Figure 13:
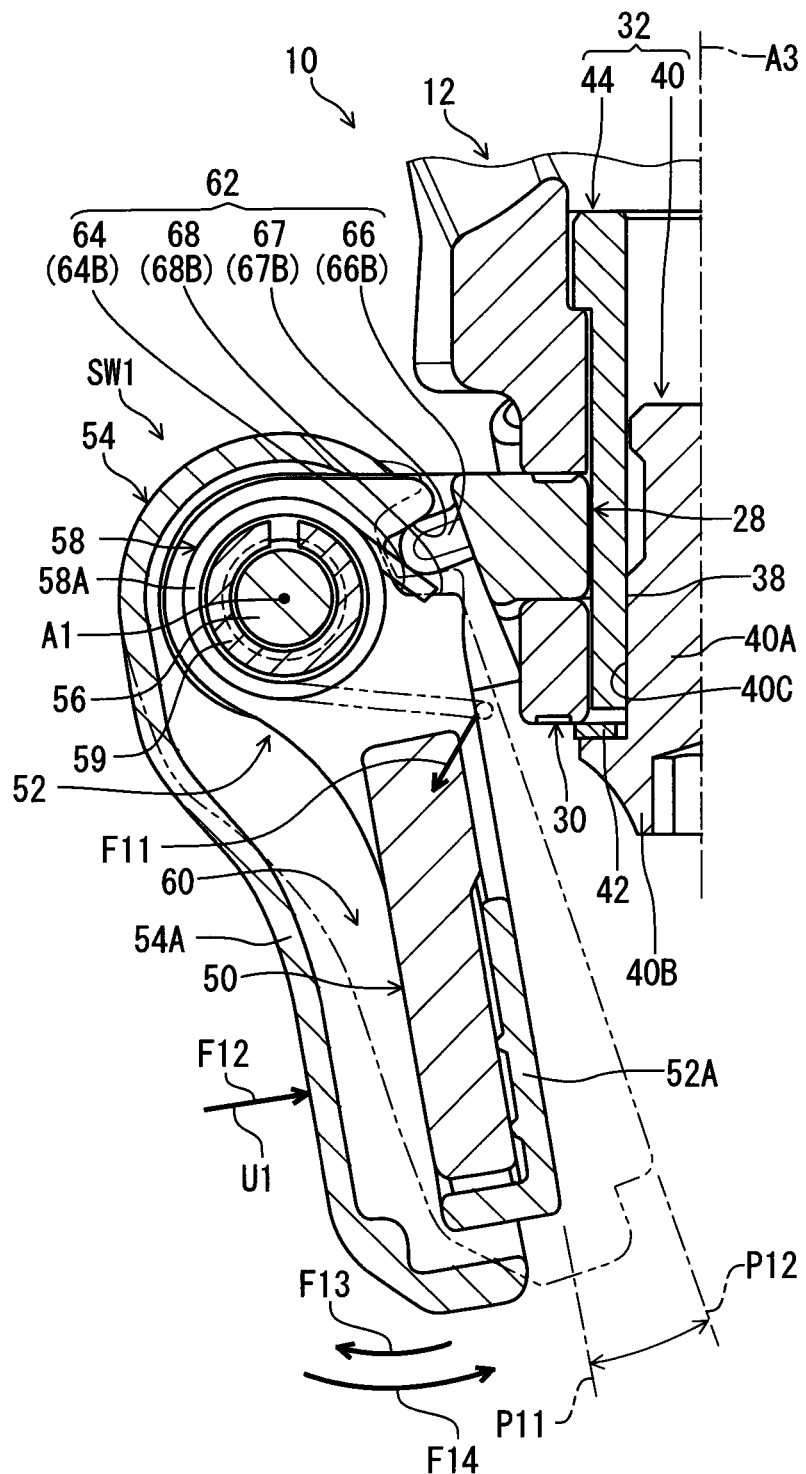
FIG. 13 is a cross-sectional view of the switch unit of the operating device taken along line XIII-XIII of FIG. 8.

As seen in FIGS. 11 and 13, in the present embodiment, the rest-position surface 67 includes a first rest-position surface 67A and a second rest-position surface 67B. The operated-position surface 68 includes a first operated-position surface 68A and a second operated-position surface 68B. The first recess 64A is defined between the first rest-position surface 67A and the first operated-position surface 68A. The second recess 64B is defined between the second rest-position surface 67B and the second operated-position surface 68B.

The first projection 66A is in contact with the first rest-position surface 67A in the rest state. The first projection 66A is in contact with the first operated-position surface 68A in the operated state. The second projection 66B is in contact with the second rest-position surface 67B in the rest state. The second projection 66B is in contact with the second operated-position surface 68B in the operated state.

Figure 14:
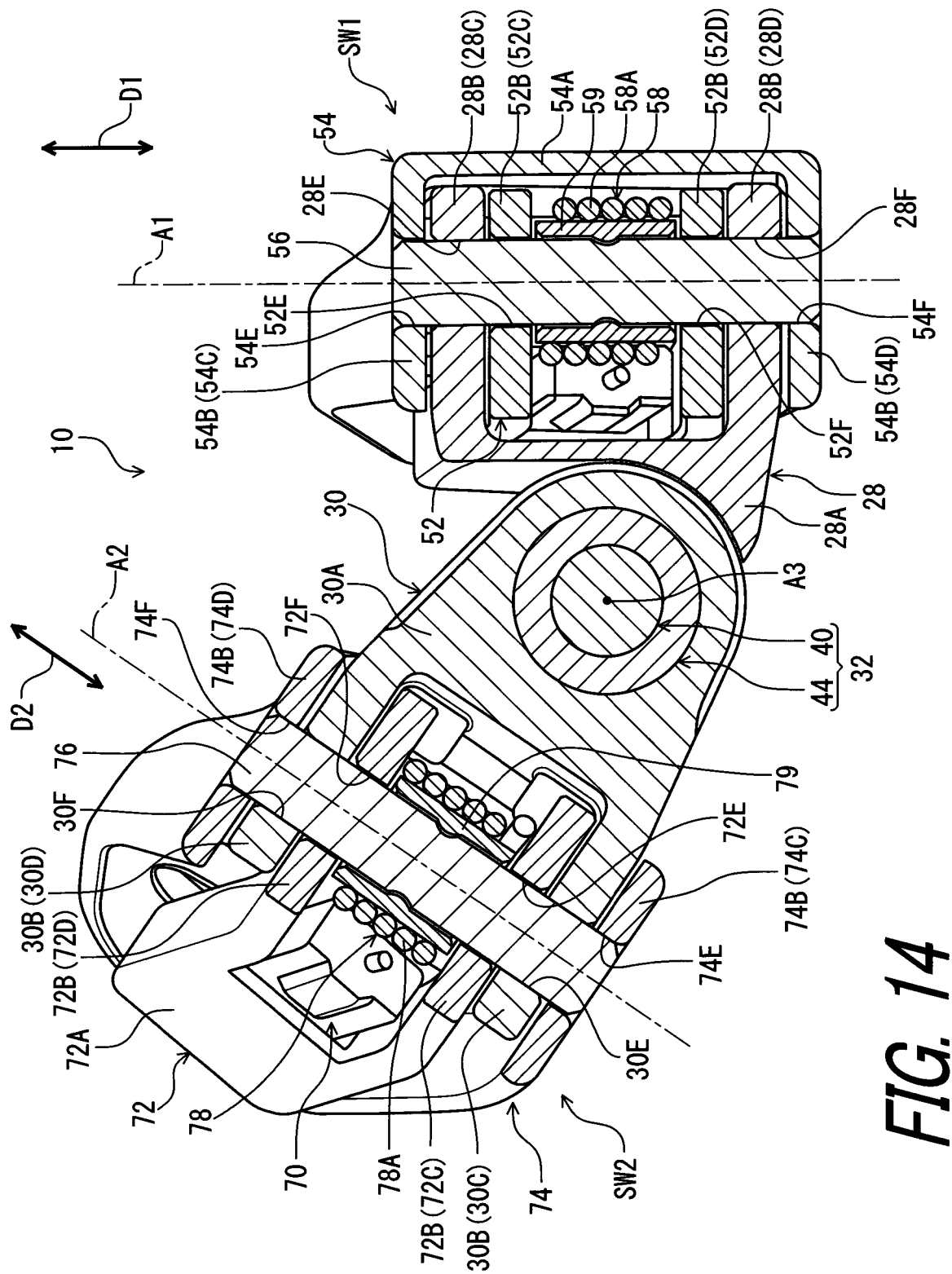
FIG. 14 is a cross-sectional view of the operating device taken along line XIV-XIV of FIG. 18.

As seen in FIG. 14, the cover coupling part 54B includes a first cover coupling part 54C and a second cover coupling part 54D. The second cover coupling part 54D is spaced apart from the first cover coupling part 54C in the axial direction D1 with respect to the pivot axis A1. The first cover coupling part 54C extends from the cover body 54A. The first cover coupling part 54C is configured to be pivotally coupled to the base member 28 about the pivot axis A1. The second cover coupling part 54D extends from the cover body 54A. The second cover coupling part 54D is configured to be pivotally coupled to the base member 28 about the pivot axis A1.

The first cover coupling part 54C includes a first cover coupling hole 54E. The second cover coupling part 54D includes a second cover coupling hole 54F. The pivot pin 56 extends through the first cover coupling hole 54E and the second cover coupling hole 54F.

As seen in FIG. 10, the switch base 52 includes a base part 52A and a base coupling part 52B extending from the base part 52A. The base coupling part 52B is configured to be pivotally coupled to the base member 28 about the pivot axis A1. The base coupling part 52B includes a first base coupling part 52C and a second base coupling part 52D. The second base coupling part 52D is spaced apart from the first base coupling part 52C in the axial direction D1 with respect to the pivot axis A1. The first base coupling part 52C extends from the base part 52A. The first base coupling part 52C is configured to be pivotally coupled to the base member 28 about the pivot axis A1. The second base coupling part 52D extends from the base part 52A. The second base coupling part 52D is configured to be pivotally coupled to the base member 28 about the pivot axis A1.

As seen in FIG. 11, the internal space 60 is provided between the base part 52A and the switch cover 54. The internal space 60 is provided between the base part 52A and the cover body 54A.

As seen in FIG. 14, the first base coupling part 52C includes a first base coupling hole 52E. The second base coupling part 52D includes a second base coupling hole 52F. The pivot pin 56 extends through the first base coupling hole 52E and the second base coupling hole 52F.

As seen in FIG. 10, the base member 28 includes a base body 28A and a support body 28B. The support body 28B extends from the base body 28A. The support body 28B is configured to be pivotally coupled to the switch base 52 about the pivot axis A1. The support body 28B includes a first support 28C and a second support 28D. The second support 28D is spaced apart from the first support 28C in the axial direction D1 with respect to the pivot axis A1. The first support 28C extends from the base body 28A. The first support 28C is configured to be pivotally coupled to the switch base 52 about the pivot axis A1. The second support 28D extends from the base body 28A. The second support 28D is configured to be pivotally coupled to the switch base 52 about the pivot axis A1.

As seen in FIG. 14, the first support 28C includes a first support hole 28E. The second support 28D includes a second support hole 28F. The pivot pin 56 extends through the first support hole 28E and the second support hole 28F.

The biasing member 58 is provided between the first cover coupling part 54C and the second cover coupling part 54D in the axial direction D1. The biasing member 58 is provided between the first base coupling part 52C and the second base coupling part 52D in the axial direction D1. The biasing member 58 is provided between the first support 28C and the second support 28D in the axial direction D1. However, the biasing member 58 can be provided outside an area defined between the first cover coupling part 54C and the second cover coupling part 54D in the axial direction D1, an area defined between the first base coupling part 52C and the second base coupling part 52D in the axial direction D1, and an area defined between the first support 28C and the second support 28D in the axial direction D1.

Figure 15:
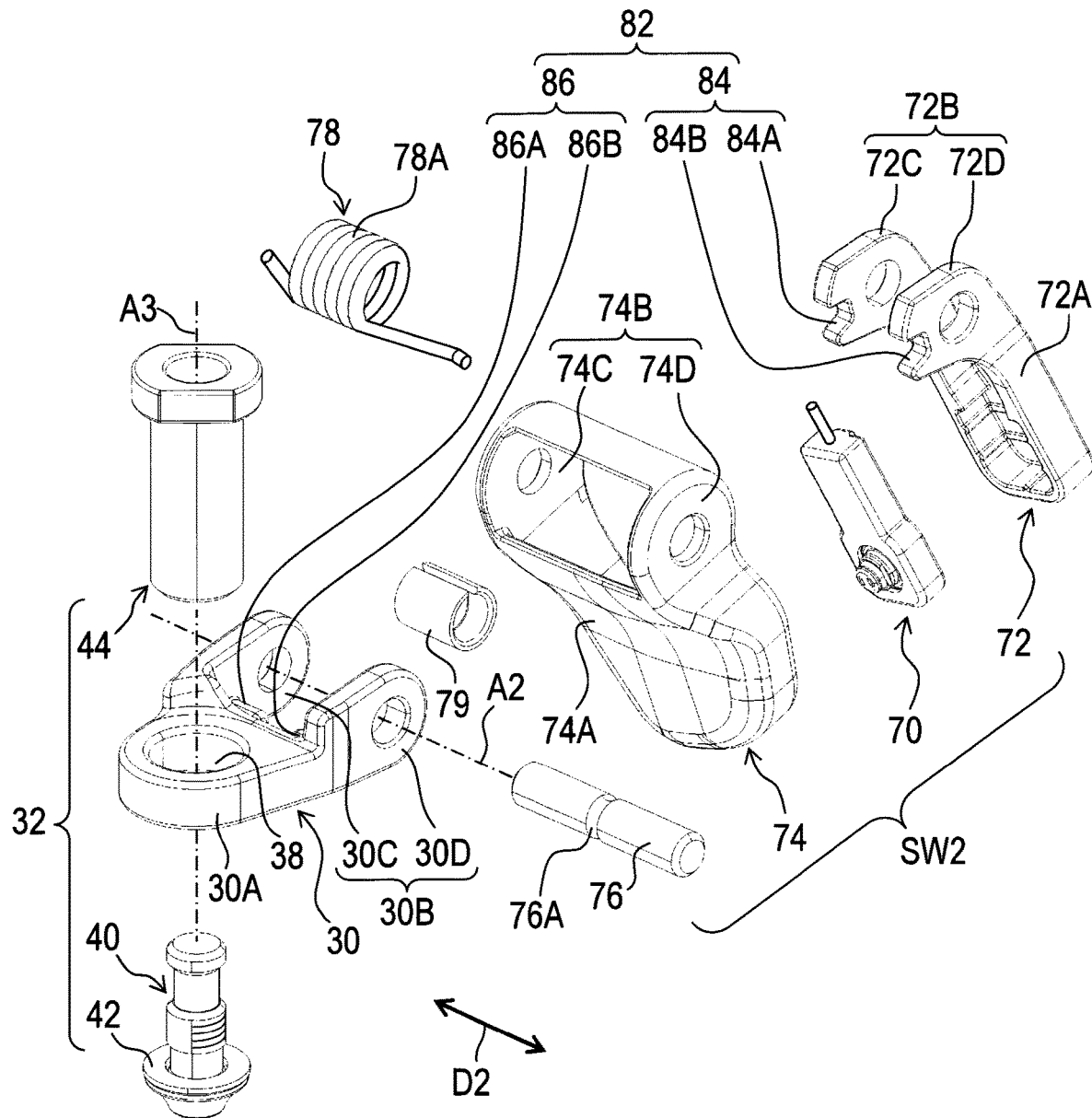
FIG. 15 is an exploded perspective view of an additional switch unit of the operating device illustrated in FIG. 2.

As seen in FIG. 15, the additional switch unit SW2 includes an additional switch 70. The additional switch 70 is configured to be activated in response to the additional user input U2. The additional switch 70 is mounted to the additional base member 30. The additional switch unit SW2 includes an additional switch base 72. The additional switch base 72 is pivotally coupled to the additional base member 30 about an additional pivot axis A2. The additional switch 70 is mounted to the additional switch base 72. The additional switch unit SW2 includes an additional switch cover 74. The additional switch cover 74 is configured to be attached to the additional switch base 72.

The additional switch unit SW2 further comprises an additional pivot pin 76. The additional pivot pin 76 is configured to pivotally couple the additional switch base 72 to the additional base member 30 about the additional pivot axis A2. The additional switch unit SW2 further comprises an additional biasing member 78. The additional biasing member 78 is provided about the additional pivot pin 76. The additional biasing member 78 includes an additional coiled part 78A. The additional pivot pin 76 extends through the additional coiled part 78A along the additional pivot axis A2. The additional switch unit SW2 includes a bush 79. The additional pivot pin 76 extends through the bush 79. The additional pivot pin 76 includes an additional groove 76A. The bush 79 is partially fitted in the additional groove 76A of the additional pivot pin 76. The bush 79 is configured to restrict the additional pivot pin 76 from moving relative to the additional base member 30 and the additional switch base 72 in an axial direction D2 with respect to the additional pivot axis A2. The bush 79 is provided in the additional coiled part 78A to support the additional biasing member 78 about the additional pivot axis A2.

Figure 16:
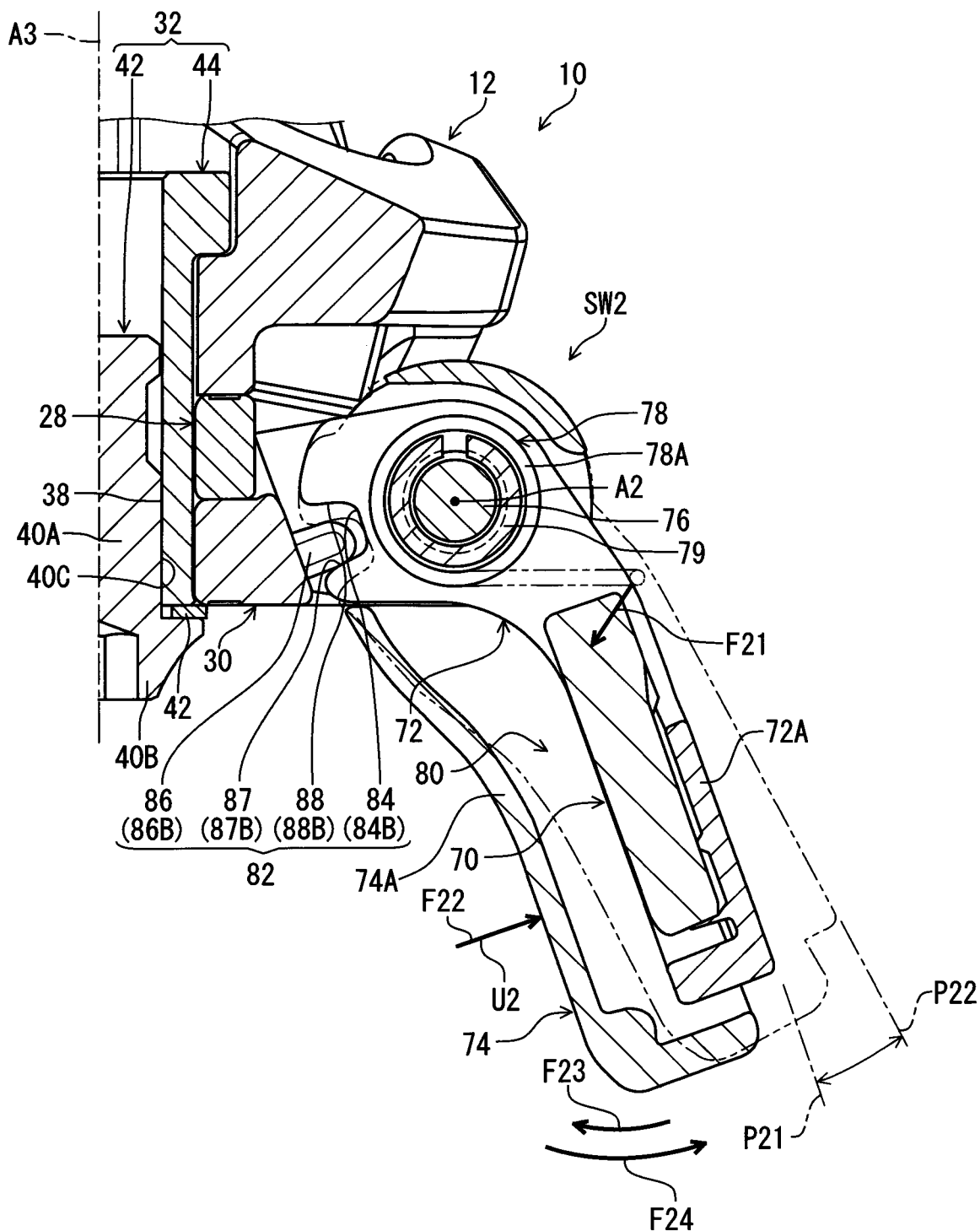
FIG. 16 is a cross-sectional view of the switch unit of the operating device taken along line XVI-XVI of FIG. 8.

As seen in FIG. 16, the additional switch cover 74 is configured to be attached to the additional switch base 72 to define an additional internal space 80 between the additional switch base 72 and the additional switch cover 74. The additional switch 70 is provided in the additional internal space 80. The additional biasing member 78 is provided in the additional internal space 80. However, at least one of the additional switch 70 and the additional biasing member 78 can be at least partially provided outside the additional internal space 80 if needed and/or desired.

The additional switch cover 74 is a separate member from the additional switch base 72. The additional switch cover 74 is pivotable relative to the additional base member 30. In the present embodiment, the additional switch base 72 is made of a first additional material. The additional switch cover 74 is made of a second additional material different from the first additional material. The first additional material includes a resin material. The second additional material includes an elastic material. Examples of the elastic material include elastomer such as rubber. However, the first additional material and the second additional material are not limited to the above materials.

The additional switch base 72 and the additional switch 70 are pivotable relative to the additional base member 30 about the additional pivot axis A2 between an rest position P21 in which the additional switch 70 does not receive the additional user input U2 and an operated position P22 in which the additional switch 70 is activated in response to the additional user input U2. The additional switch base 72, the additional switch 70, and the additional switch cover 74 are pivotable relative to the additional base member 30 about the additional pivot axis A2 between the rest position P21 and the operated position P22.

The additional biasing member 78 is configured to apply a biasing force F21 to the additional switch base 72 to move relative to the additional base member 30 from the operated position P22 to the rest position P21. The additional switch 70 is configured to be activated in response to an operating state in which an operating force F22 applied to the additional switch 70 as the additional user input U2 is larger than the biasing force F21. For example, the biasing force F21 generates a biasing rotational force F23 about the pivot axis A1. The operating force F22 generates an operating rotational force F24 about the pivot axis A1. The operating rotational force F24 is larger than the biasing rotational force F23. Thus, the additional biasing member 78 is configured to allow the additional switch base 72 to pivot relative to the additional base member 30 about the additional pivot axis A2 from the rest position P21 toward the operated position P22 in response to the operating force F22 applied to the additional switch 70 without activating the additional switch 70. The additional switch unit SW2 is configured to pivot about the additional pivot axis A2 from the rest position P21 to the operated position P22 in response to the operating force F22. The additional switch 70 is configured to not be activated in response to the operating force F22 in a state where the additional switch base 72 is in a position other than the operated position P22. The additional switch unit SW2 receives the operating force F22 without pivoting relative to the additional base member 30 in an operated state where the additional switch unit SW2 is in the operated position P22. Thus, the additional switch 70 is configured to be activated in response to the operating force F22 in an operated state where the additional switch base 72 is in the operated position P22.

The additional switch 70 has substantially the same structure as the structure of the switch 50 illustrated in FIG. 12. Thus, the description and depiction of the switch 50 can be utilized as the description and depiction of the additional switch 70.

As seen in FIG. 15, the additional switch cover 74 includes a cover body 74A and a cover coupling part 74B extending from the cover body 74A. The cover coupling part 74B is configured to be pivotally coupled to the additional base member 30 about the additional pivot axis A2. As seen in FIG. 16, the additional internal space 80 is provided between the additional switch base 72 and the cover body 74A.

As seen in FIG. 15, the additional switch unit SW2 further comprises a stopper 82. The stopper 82 is configured to restrict a pivotal movement of the additional switch base 72 between the rest position P21 and the operated position P22. The stopper 82 includes a recess 84 and a projection 86 provided in the recess 84. The recess 84 is provided to one of the additional base member 30 and the additional switch base 72. The projection 86 is provided to the other of the additional base member 30 and the additional switch base 72.

In the present embodiment, the recess 84 is provided to the additional switch base 72. The projection 86 is provided to the additional base member 30. However, the recess 84 can be provided to the additional base member 30 as a one-piece unitary member if needed and/or desired. The projection 86 can be provided to the additional switch base 72 if needed and/or desired.

The recess 84 includes a first recess 84A and a second recess 84B. The projection 86 includes a first projection 86A and a second projection 86B. The first recess 84A and the second recess 84B are provided to one of the additional base member 30 and the additional switch base 72. The first projection 86A and the second projection 86B are provided to the other of the additional base member 30 and the additional switch base 72.

The first recess 84A and the second recess 84B are provided to the additional switch base 72. The first projection 86A and the second projection 86B are provided to the additional base member 30. The first projection 86A is provided in the first recess 84A. The second projection 86B is provided in the second recess 84B.

As seen in FIG. 16, the stopper 82 includes a rest-position surface 87 and an operated-position surface 88. The recess 84 is defined between the rest-position surface 87 and the operated-position surface 88. The projection 86 is in contact with the rest-position surface 87 in a rest state where the additional switch base 72 is provided in the rest position P21. The projection 86 is in contact with the operated-position surface 88 in an operated state where the additional switch base 72 is provided in the operated position P22.

Figure 17:
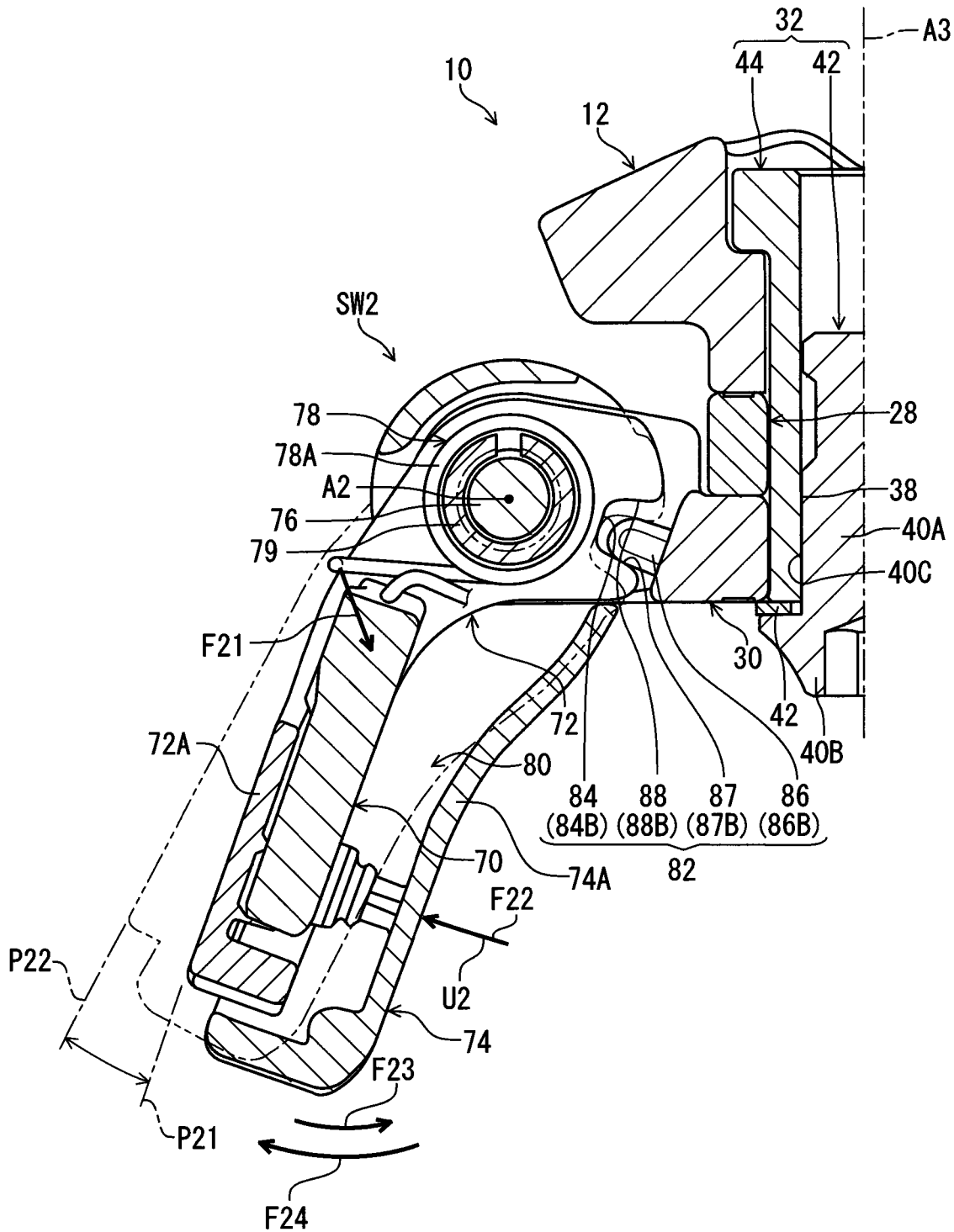
FIG. 17 is a cross-sectional view of the switch unit of the operating device taken along line XVII-XVII of FIG. 8.

As seen in FIGS. 16 and 17, in the present embodiment, the rest-position surface 87 includes a first rest-position surface 87A and a second rest-position surface 87B. The operated-position surface 88 includes a first operated-position surface 88A and a second operated-position surface 88B. The first recess 84A is defined between the first rest-position surface 87A and the first operated-position surface 88A. The second recess 84B is defined between the second rest-position surface 87B and the second operated-position surface 88B.

The first projection 86A is in contact with the first rest-position surface 87A in the rest state. The first projection 86A is in contact with the first operated-position surface 88A in the operated state. The second projection 86B is in contact with the second rest-position surface 87B in the rest state. The second projection 86B is in contact with the second operated-position surface 88B in the operated state.

As seen in FIG. 14, the cover coupling part 74B includes a first cover coupling part 74C and a second cover coupling part 74D. The second cover coupling part 74D is spaced apart from the first cover coupling part 74C in the axial direction D2 with respect to the additional pivot axis A2. The first cover coupling part 74C extends from the cover body 74A. The first cover coupling part 74C is configured to be pivotally coupled to the additional base member 30 about the additional pivot axis A2. The second cover coupling part 74D extends from the cover body 74A. The second cover coupling part 74D is configured to be pivotally coupled to the additional base member 30 about the additional pivot axis A2.

The first cover coupling part 74C includes a first cover coupling hole 74E. The second cover coupling part 74D includes a second cover coupling hole 74F. The additional pivot pin 76 extends through the first cover coupling hole 74E and the second cover coupling hole 74F.

As seen in FIG. 15, the additional switch base 72 includes a base part 72A and a base coupling part 72B extending from the base part 72A. The base coupling part 72B is configured to be pivotally coupled to the additional base member 30 about the additional pivot axis A2. The base coupling part 72B includes a first base coupling part 72C and a second base coupling part 72D. The second base coupling part 72D is spaced apart from the first base coupling part 72C in the axial direction D2 with respect to the additional pivot axis A2. The first base coupling part 72C extends from the base part 72A. The first base coupling part 72C is configured to be pivotally coupled to the additional base member 30 about the additional pivot axis A2. The second base coupling part 72D extends from the base part 72A. The second base coupling part 72D is configured to be pivotally coupled to the additional base member 30 about the additional pivot axis A2.

As seen in FIG. 16, the additional internal space 80 is provided between the base part 72A and the additional switch cover 74. The additional internal space 80 is provided between the base part 72A and the cover body 74A.

As seen in FIG. 14, the first base coupling part 72C includes a first base coupling hole 72E. The second base coupling part 72D includes a second base coupling hole 72F. The additional pivot pin 76 extends through the first base coupling hole 72E and the second base coupling hole 72F.

As seen in FIG. 15, the additional base member 30 includes a base body 30A and a support body 30B. The support body 30B extends from the base body 30A. The support body 30B is configured to be pivotally coupled to the additional switch base 72 about the additional pivot axis A2. The support body 30B includes a first support 30C and a second support 30D. The second support 30D is spaced apart from the first support 30C in the axial direction D2 with respect to the additional pivot axis A2. The first support 30C extends from the base body 30A. The first support 30C is configured to be pivotally coupled to the additional switch base 72 about the additional pivot axis A2. The second support 30D extends from the base body 30A. The second support 30D is configured to be pivotally coupled to the additional switch base 72 about the additional pivot axis A2.

As seen in FIG. 14, the first support 30C includes a first support hole 30E. The second support 30D includes a second support hole 30F. The additional pivot pin 76 extends through the first support hole 30E and the second support hole 30F.

The additional biasing member 78 is provided between the first cover coupling part 74C and the second cover coupling part 74D in the axial direction D2. The additional biasing member 78 is provided between the first base coupling part 72C and the second base coupling part 72D in the axial direction D2. The additional biasing member 78 is provided between the first support 30C and the second support 30D in the axial direction D2. However, the additional biasing member 78 can be provided outside an area defined between the first cover coupling part 74C and the second cover coupling part 74D in the axial direction D2, an area defined between the first base coupling part 72C and the second base coupling part 72D in the axial direction D2, and an area defined between the first support 30C and the second support 30D in the axial direction D2.

Figure 18:
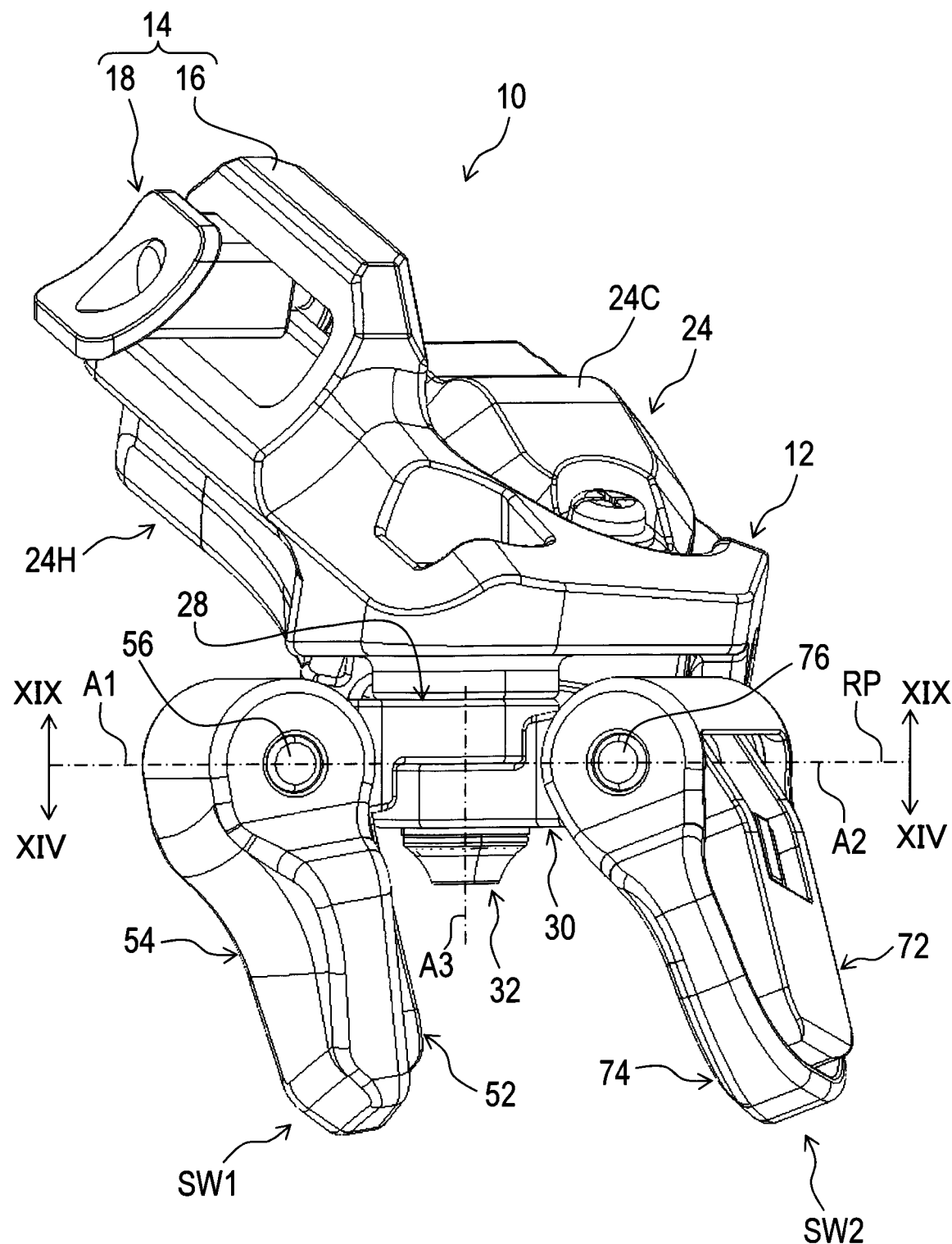
FIG. 18 is a perspective view of the operating device illustrated in FIG. 2.

As seen in FIG. 18, the pivot axis A1 and the additional pivot axis A2 define a reference plane RP. The reference plane RP intersects with the attachment axis A3. In the present embodiment, the reference plane RP is perpendicular to the attachment axis A3. However, the reference plane RP can be non-perpendicular to the attachment axis A3 if needed and/or desired. The reference plane RP can be inclined relative to the attachment axis A3 if needed and/or desired.

Figure 19:
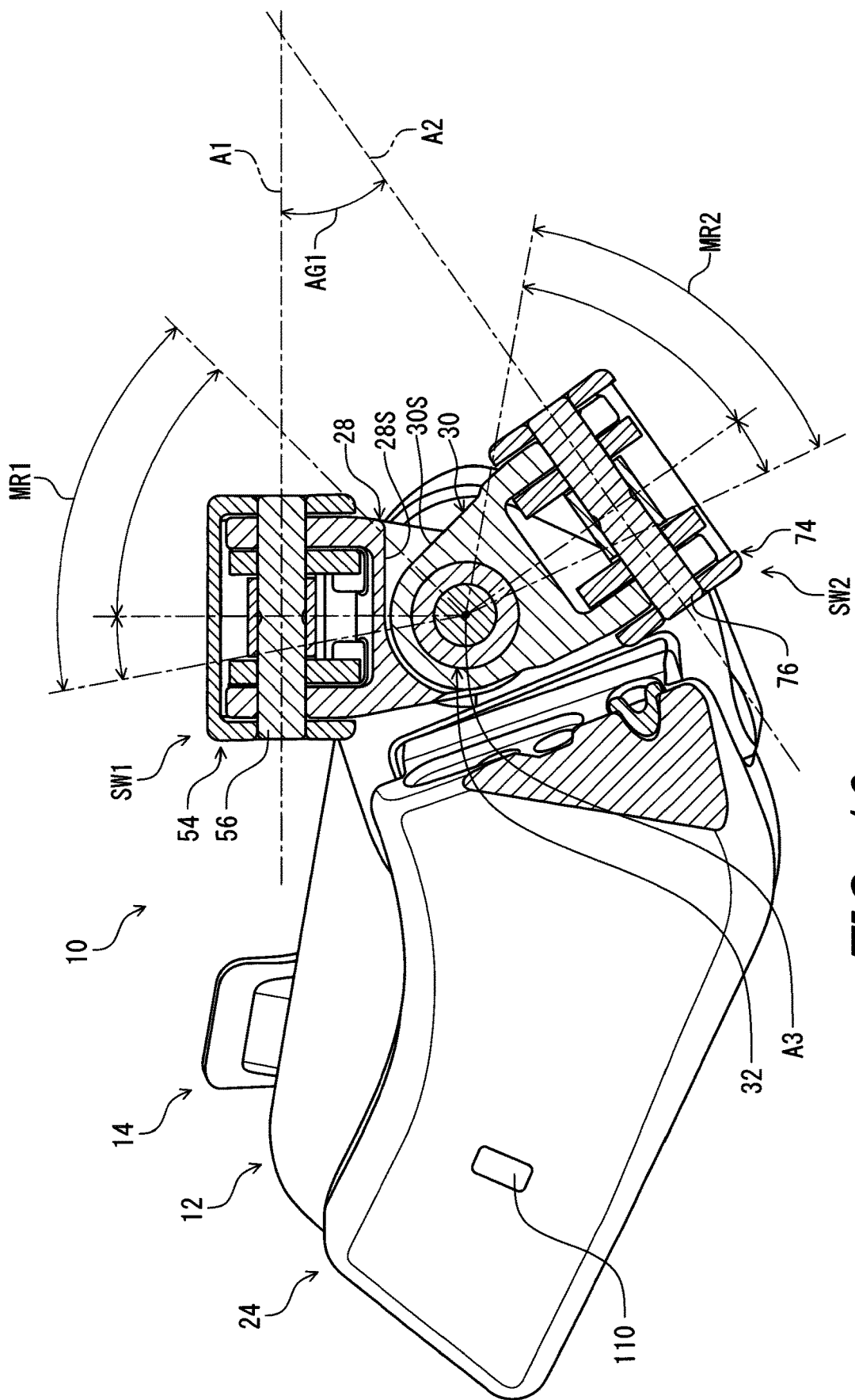
FIG. 19 is a cross-sectional view of the switch unit of the operating device taken along line XIX-XIX of FIG. 18.

As seen in FIG. 19, the pivot axis A1 and the additional pivot axis A2 intersect with each other. The fastener 32 is configured to fasten the switch unit SW1 and the additional switch unit SW2 to the base structure 12 such that at least one of the switch unit SW1 and the additional switch unit SW2 is adjustably coupled relative to the base structure 12 about the attachment axis A3. The pivot axis A1 and the additional pivot axis A2 are configured to be adjustable relative to each other. At least one of the base member 28 and the additional base member 30 is adjustably coupled to the base structure 12 such that a first angle AG1 defined between the pivot axis A1 and the additional pivot axis A2 is variable on the reference plane RP. In the present embodiment, the first angle AG1 ranges from 30 degrees to 90 degrees as viewed along the attachment axis A3. However, the range of the first angle AG1 is not limited to the above range.

In the present embodiment, the switch unit SW1 is pivotable relative to the base structure 12 about the attachment axis A3 within a movable range MR1 in a released state where the fastener 32 does not fasten the switch unit SW1 and the additional switch unit SW2 to the base structure 12. The base member 28 is pivotable relative to the base structure 12 about the attachment axis A3 within a movable range MR1 in the released state. The switch unit SW1 is positioned in any one of circumferential positions defined within the movable range MR1 in the fastening state.

The additional switch unit SW2 is pivotable relative to the base structure 12 about the attachment axis A3 within an additional movable range MR2 in the released state. The additional base member 30 is pivotable relative to the base structure 12 about the attachment axis A3 within the additional movable range MR2 in the released state. The additional switch unit SW2 is positioned in any one of circumferential positions defined within the additional movable range MR2 in the fastening state.

The base member 28 includes a first stopper surface 28S. The additional base member 30 includes a second stopper surface 30S. The first angle AG1 is the largest in a state where the first stopper surface 28S is in contact with the second stopper surface 30S.

Figure 20:
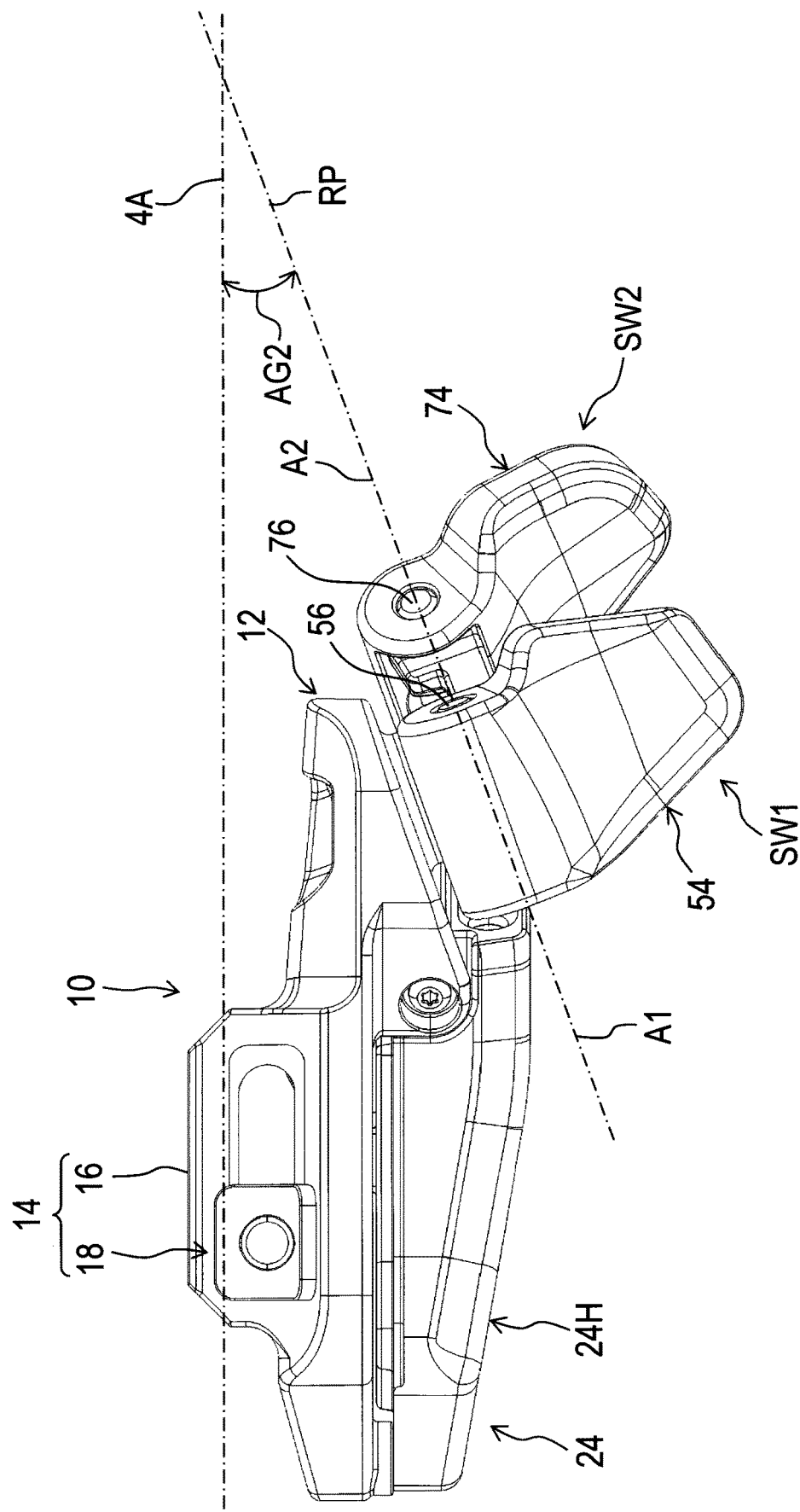
FIG. 20 is an elevational view of the operating device illustrated in FIG. 2.

As seen in FIG. 20, a second angle AG2 is defined between the reference plane RP and the longitudinal center axis 4A of the tubular part 4. The second angle AG2 ranges from 10 degrees to 30 degrees. However, the second angle AG2 is not limited to the above range.

Figure 21:
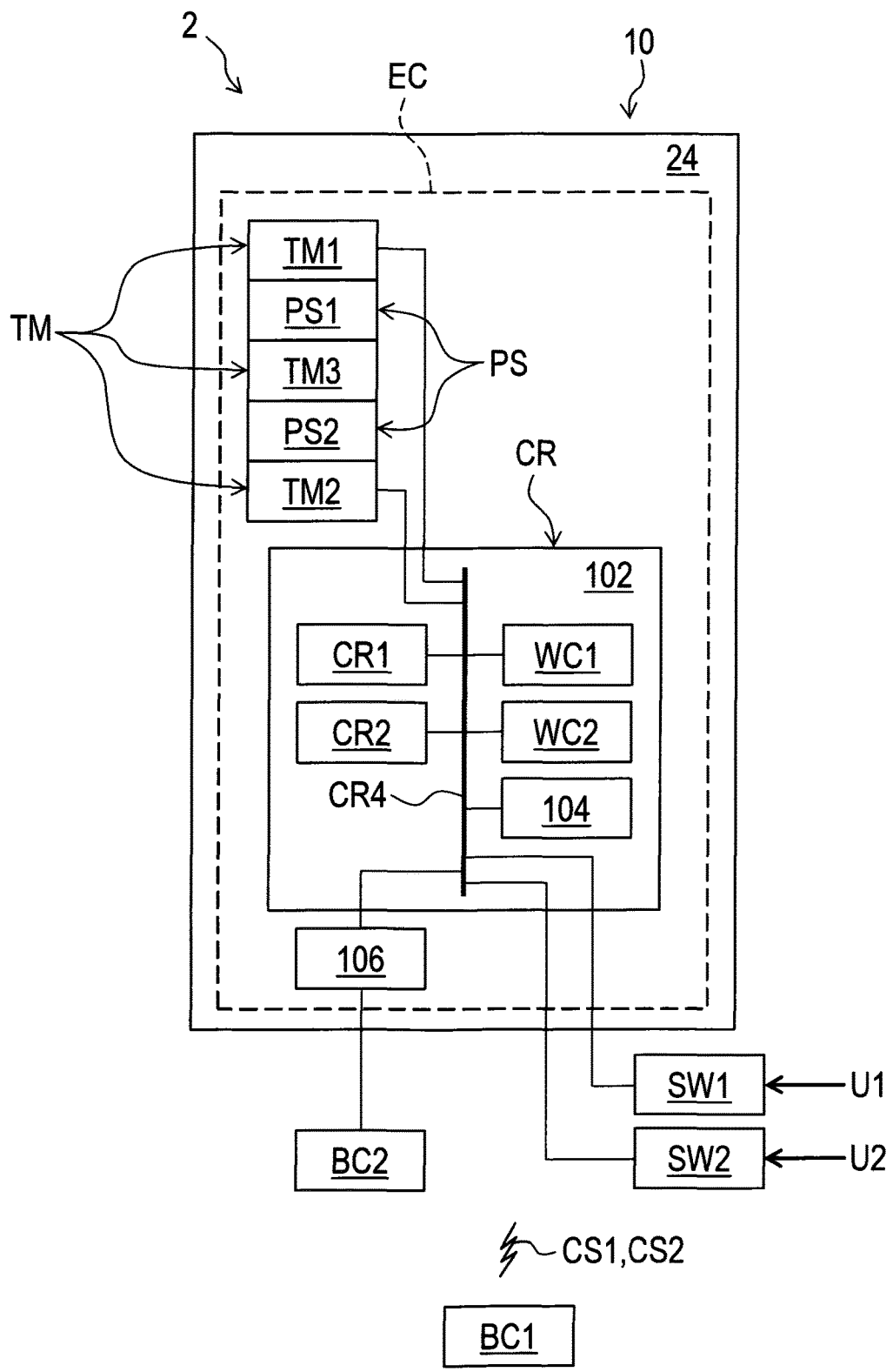
FIG. 21 is a schematic block diagram of the operating device illustrated in FIG. 2.

As seen in FIG. 21, the electric component EC includes at least one of a substrate, a wireless communicator WC1, and a wired communicator WC2. In the present embodiment, the electric component EC includes a substrate 102. The electric component EC includes a wireless communicator WC1. The electric component EC includes a wired communicator WC2. The electric component EC includes a controller CR, an informing unit 104, and a connection port 106. The controller CR includes the substrate 102. The wireless communicator WC1, the wired communicator WC2, and the informing unit 104 are electrically mounted on the substrate 102. The controller CR is configured to be electrically connected to the switch unit SW1, the additional switch unit SW2, the wireless communicator WC1, the wired communicator WC2, the informing unit 104, and the connection port 106.

The wireless communicator WC1 is configured to communicate with another wireless communicator via a wireless communication channel. The wired communicator WC2 is configured to communicate with another wired communicator via a wired communication channel. In the present embodiment, the wireless communicator WC1 is configured to communicate with a wireless communicator of the electric device BC1 via a wireless communication channel. The wired communicator WC2 is configured to communicate with the wired communicator of the electric device BC2 via the wired communication channel. The wireless communicator WC1 can also be referred to as a wireless communication circuit or circuitry WC1. The wired communicator WC2 can also be referred to as a wired communication circuit or circuitry WC2.

The controller CR is configured to control another device in response to the user input U1, the additional user input U2, and/or other information. In the present embodiment, the controller CR is configured to control the wireless communicator WC1 to transmit a control signal CS1 and/or CS2 to the electric device BC1. In a case where the electric device BC2 includes an operated device, the controller CR is configured to control the wireless communicator WC1 and the wired communicator WC2 to transmit a control signal CS1 and/or CS2 to the electric device BC1 and/or BC2. In a case where the electric device BC2 includes a satellite operating device, the controller CR is configured to control the wired communicator WC2 to receive a signal from the electric device BC2 and is configured to control the wireless communicator WC1 to transmit a control signal to the electric device BC1 or another electric device. In the present embodiment, the user input U1 and the control signal CS1 indicate upshifting of the electric device BC1. The additional user input U2 and the control signal CS2 indicate downshifting of the electric device BC1. However, the user inputs U1 and U2 and the control signals CS1 and CS2 can be used to operate other devices.

The controller CR includes a hardware processor CR1, a memory CR2, the substrate 102, and a system bus CR4. The hardware processor CR1 and the memory CR2 are electrically mounted on the substrate 102. For example, the hardware processor CR1 includes a central processing unit (CPU) and a memory controller. The hardware processor CR1 is electrically connected to the memory CR2 with the substrate 102 and the system bus CR4. Each of the wireless communicator WC1 and the wired communicator WC2 is electrically connected to the hardware processor CR1 and the memory CR2 with the substrate 102 and the system bus CR4.

The memory CR2 includes a read only memory (ROM) and a random-access memory (RAM). The memory CR2 includes storage areas each having an address in the ROM and the RAM. The hardware processor CR1 is configured to control the memory CR2 to store data in the storage areas of the memory CR2 and reads data from the storage areas of the memory CR2. The memory CR2 (e.g., the ROM) stores a program. The program is read into the hardware processor CR1, and thereby the configuration and/or algorithm of the controller CR is performed. The structure and/or configuration are not limited to the above structure and/or configuration. The controller CR can also be referred to as a control circuit or circuitry CR. The hardware processor CR1 can also be referred to as a hardware processing circuit or circuitry CR1. The memory CR2 can also be referred to as a memory circuit or circuitry CR2.

The controller CR is configured to detect connection between the connection port 106 and an electric cable. The controller CR is configured to control the wired communicator WC2 to communicate with the electric device BC2 if the controller CR detects the connection between the connection port 106 and the electric cable 5 connected to the electric device BC2. In a case where the electric device BC2 includes an additional operating device such as a satellite operating device (e.g., a satellite switch), the controller CR is configured to control another component such as the electric device BC1 based on a control signal transmitted from the electric device BC2 or other components via the electric cable 5 and the connection port 106. In a case where the electric device BC2 includes an operated component, the controller CR is configured to transmit a control signal to the operated component via the connection port 106 and the electric cable 5.

In the present embodiment, the wired communicator WC2 is configured to communicate with other wired communicators using power line communication (PLC) technology. The PLC technology is used for communicating between electric component ECs. The PLC carries data on a conductor that is also used simultaneously for electric power transmission or electric power distribution to the electric component EC. However, the wired communicator WC2 can be configured to communicate with other wired communicators without the PLC.

The controller CR is configured to update firmware stored in the memory CR2 via the connection port 106 in a case where a device configured to update firmware is electrically connected to the connection port 106.

The informing unit 104 is configured to inform the user of a state of the operating device 10. Examples of the state of the operating device 10 includes a communication state of the wireless communicator WC1, a communication state of the wired communicator WC2, a level of remaining electricity of the power supply PS, and a pairing state of the wireless communicator WC1. Examples of the informing unit 104 include a light emitting device such as a light-emitting diode (LED) and a loudspeaker. In the present embodiment, the informing unit 104 is provided to the electric-component housing 24. However, the informing unit 104 can be provided other portions of the operating device 10 if needed and/or desired. The informing unit 104 can be omitted from the operating device 10 if needed and/or desired.

Figure 22:
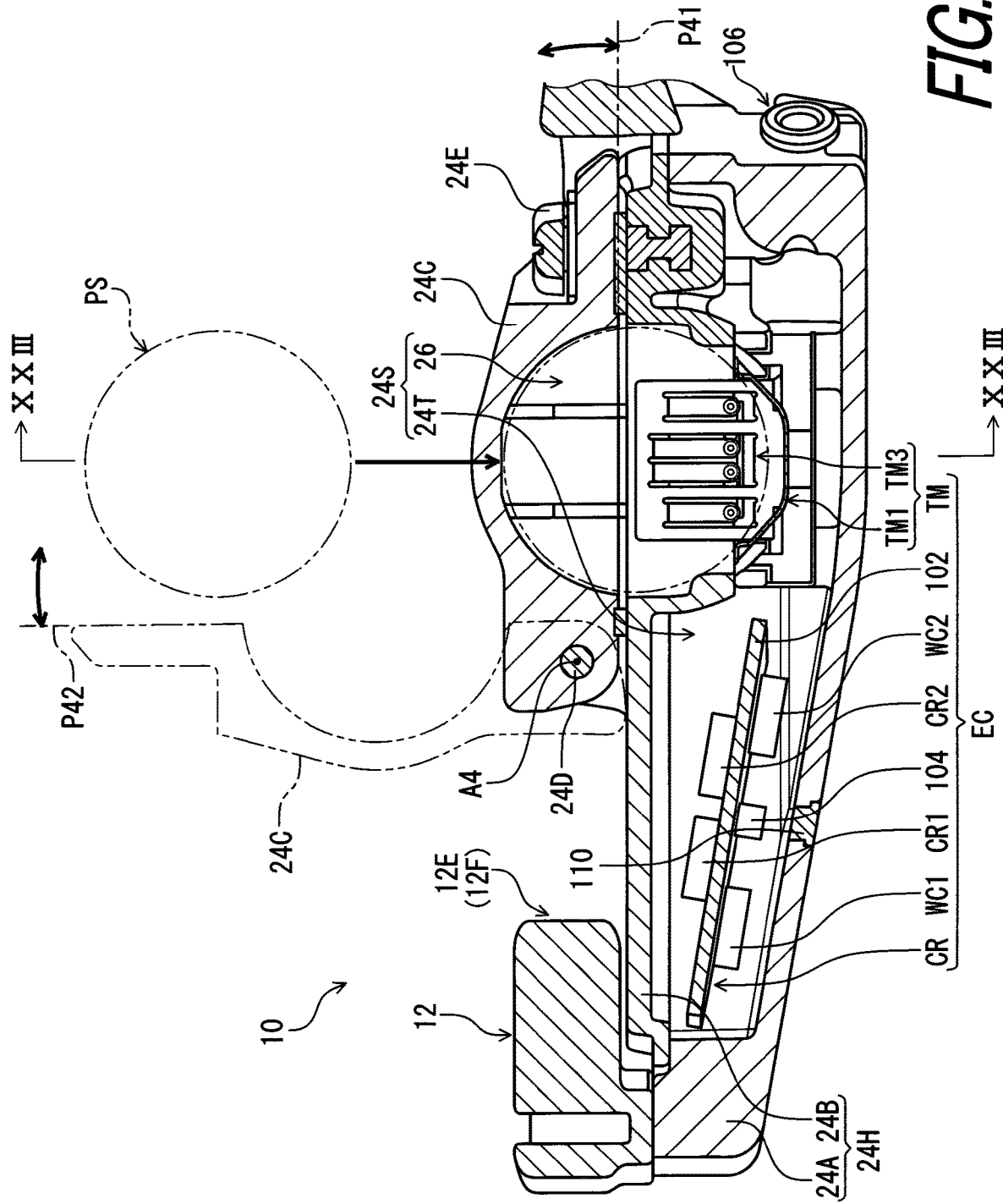
FIG. 22 is a cross-sectional view of the operating device taken along line XXII-XXII of FIG. 23.

As seen in FIG. 22, the informing unit 104 includes a light transmitting member 110 attached to the electric-component housing 24. The light transmitting member 110 is configured to transmit light emitted from the informing unit 104 to an outside of the electric-component housing 24. The light transmitting member 110 is made of a material having a light transparency.

The substrate 102 is provided in the accommodating space 24S. The wireless communicator WC1 is electrically mounted on the substrate 102 and is provided in the accommodating space 24S. The wired communicator WC2 is electrically mounted on the substrate 102 and is provided in the accommodating space 24S. The hardware processor CR1 and the memory CR2 are electrically mounted on the substrate 102 and are provided in the accommodating space 24S. In the present embodiment, the electric component EC is entirely provided in the accommodating space 24S. The substrate 102, the wireless communicator WC1, the wired communicator WC2, the controller CR, and the informing unit 104 are entirely provided in the accommodating space 24S. However, the electric component EC can be partially provided in the accommodating space 24S if needed and/or desired.

The lid 24C is pivotable relative to the housing body 24H about the lid pivot axis A4 between a closed position P41 and an open position P42. The lid 24C covers the power-supply accommodating space 26 in a closed state where the lid 24C is in the closed position P41. The power-supply accommodating space 26 is open to allow the power supply PS to be inserted into the power-supply accommodating space 26 and to be removed from the power-supply accommodating space 26 in an open state where the lid 24C is in the open position P42. The lid fastener 24E is configured to fasten the lid 24C to the housing body 24H.

Figure 23:
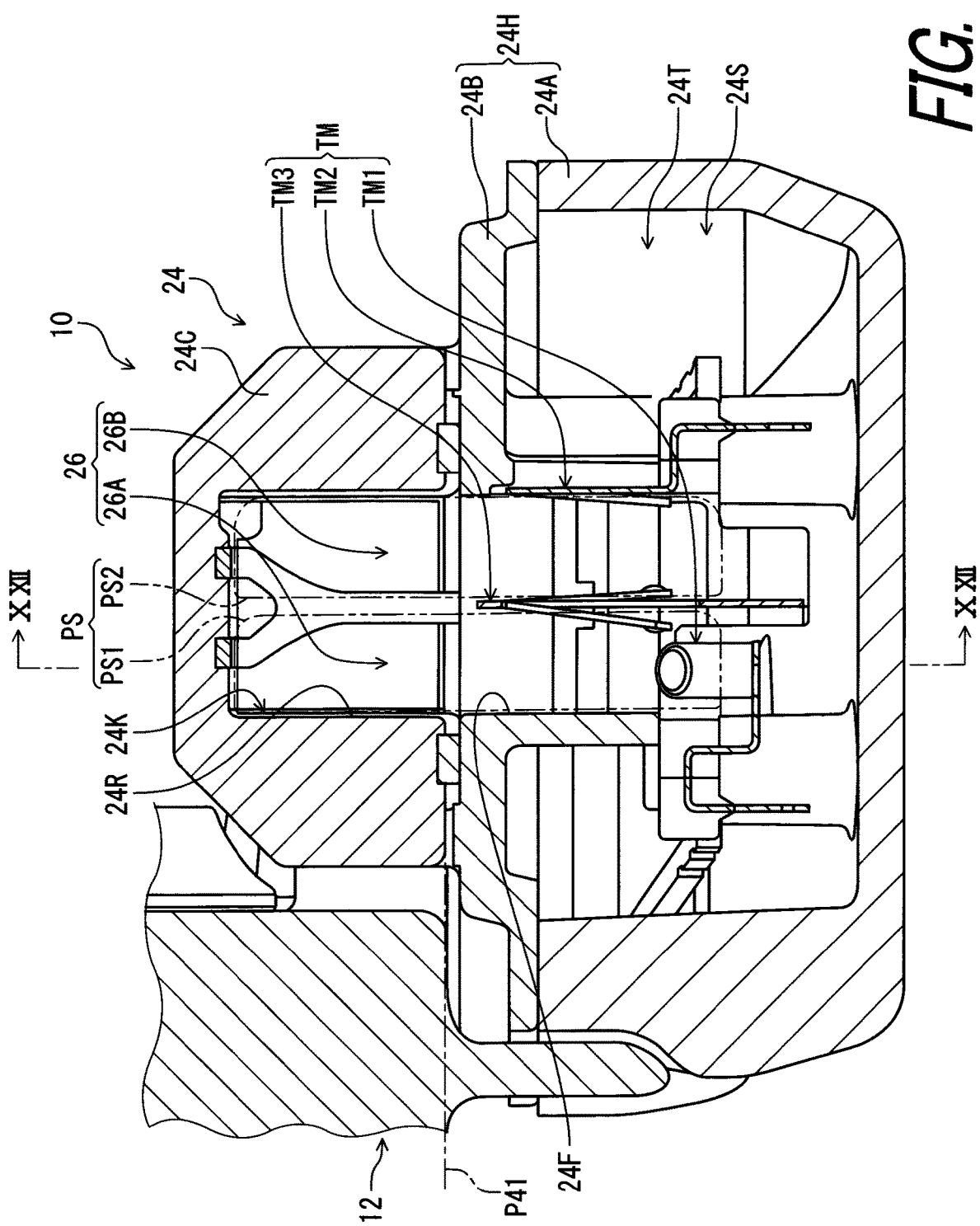
FIG. 23 is a cross-sectional view of the operating device taken along line XXIII-XXIII of FIG. 22.

As seen in FIG. 23, the lid 24C includes a holding part 24K configured to hold the power supply PS in the closed state where the lid 24C is in the closed position P41. The holding part 24K includes a recess 24R in which the power supply PS is to be provided in the closed state where the lid 24C is in the closed position P41. The power-supply accommodating space 26 includes the insertion opening 24F and the recess 24R.

Second Embodiment

An operating device 210 in accordance with a second embodiment will be described below referring to FIGS. 24 to 31. The operating device 210 has the same structure and/or configuration as those of the operating device 10 except for the base structure 12, the electric component EC, and the electric-component housing 24. Thus, elements having substantially the same function as those in the first embodiment will be numbered the same here and will not be described and/or illustrated again in detail here for the sake of brevity.

Figure 24:
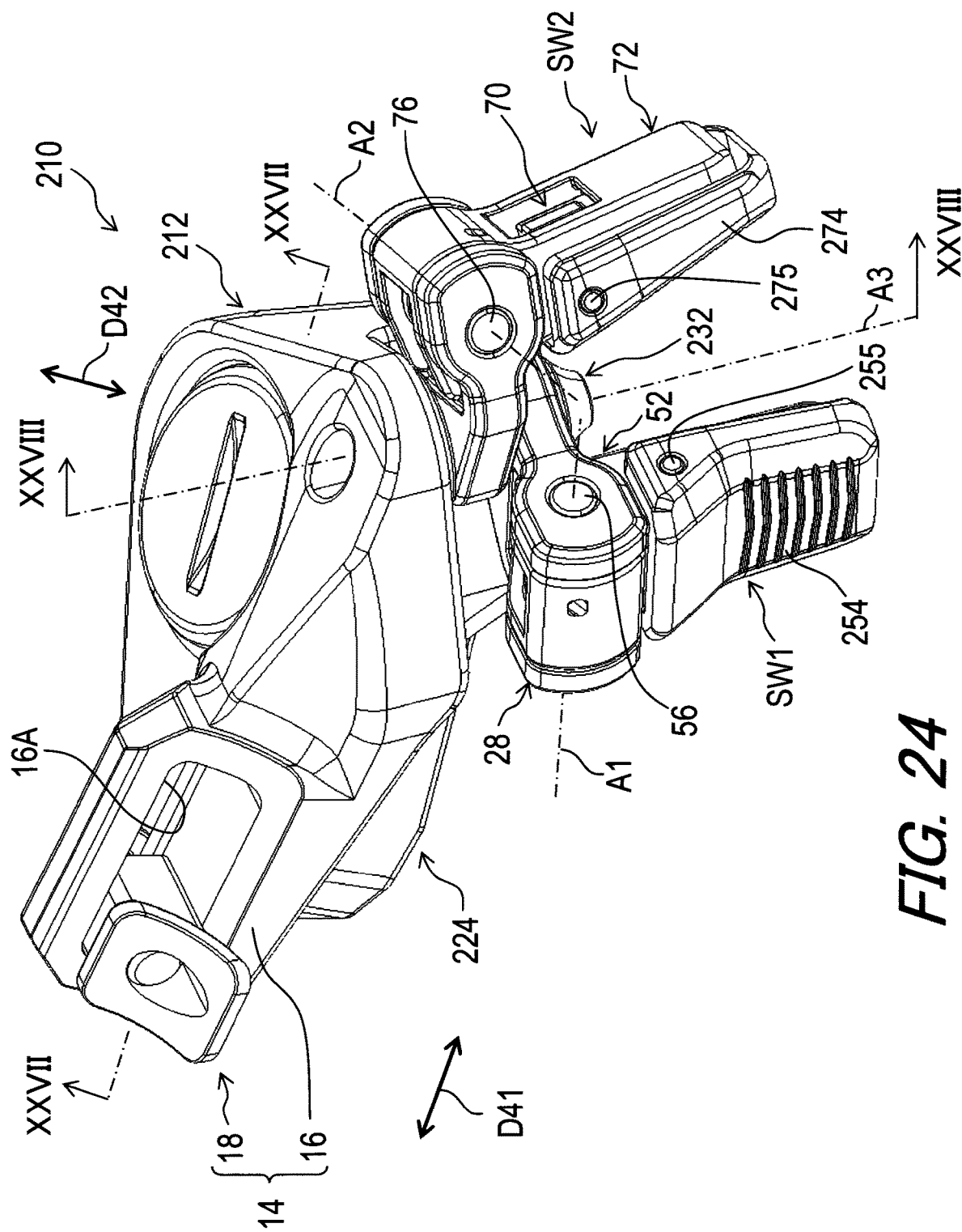
FIG. 24 is a perspective view of an operating device in accordance with a second embodiment.

As seen in FIG. 24, the operating device 210 for the human-powered vehicle 2 comprises a base structure 212. The base structure 212 has substantially the same structure as the structure of the base structure 12 of the first embodiment. The operating device 210 further comprises the mounting structure 14. The mounting structure 14 is configured to couple the base structure 212 to the human-powered vehicle 2.

The operating device 210 for the human-powered vehicle 2 comprises the switch unit SW1. The switch unit SW1 is configured to be activated in response to a user input U1. The operating device 210 further comprises the additional switch unit SW2. The additional switch unit SW2 is configured to be activated in response to an additional user input U2.

The operating device 210 for the human-powered vehicle 2 comprises an electric-component housing 224. The electric-component housing 224 is configured to be detachably coupled to the base structure 212. The electric-component housing 224 is configured to be detachably and reattachably coupled to the base structure 212.

Figure 25:
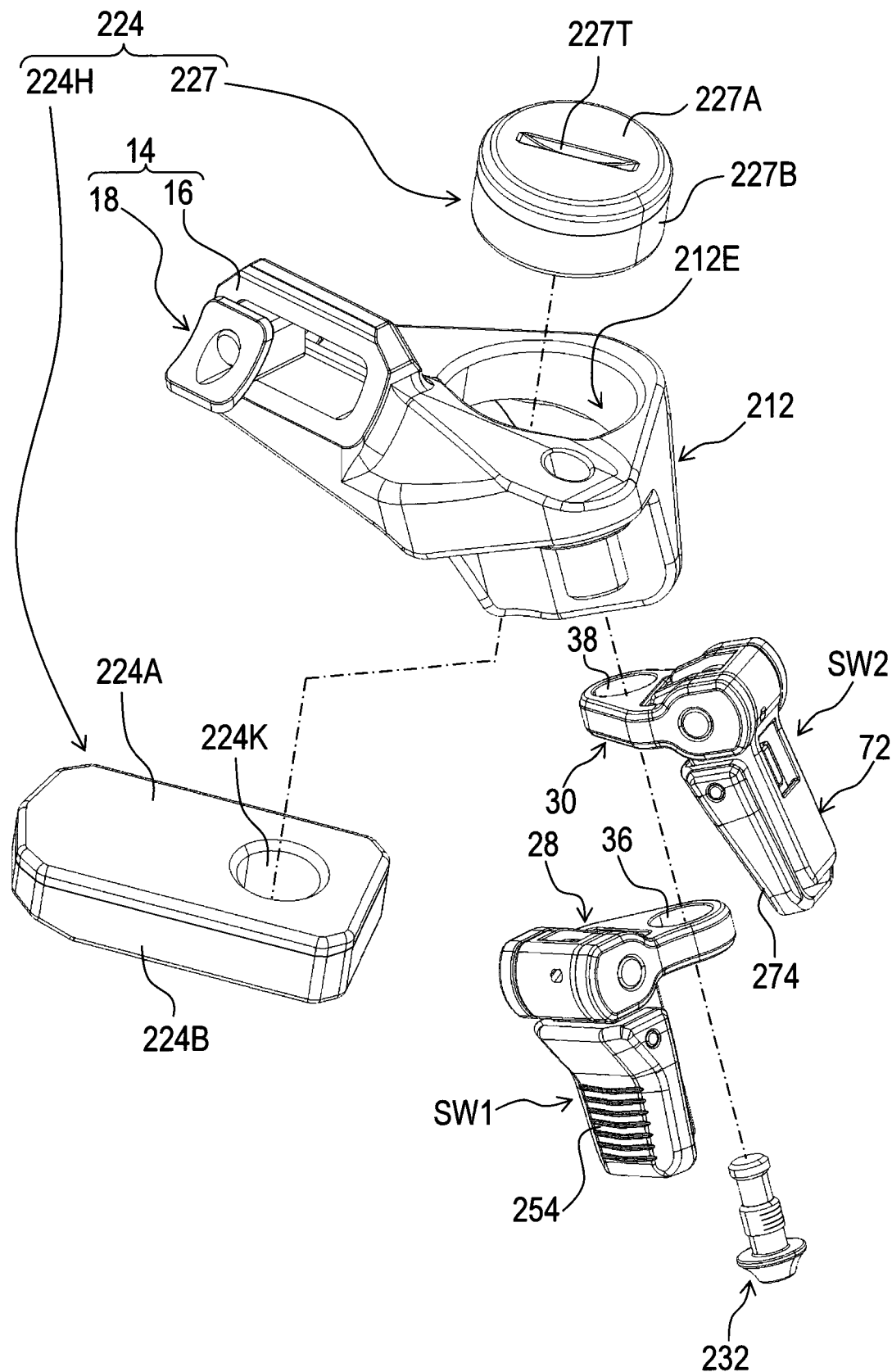
FIG. 25 is an exploded perspective view of the operating device illustrated in FIG. 24.

As seen in FIG. 25, the switch unit SW1 is configured to be detachably coupled to at least one of the electric-component housing 224 and the base structure 212. The switch unit SW1 is configured to be detachably and reattachably coupled to at least one of the electric-component housing 224 and the base structure 212. In the present embodiment, the switch unit SW1 is configured to be detachably and reattachably coupled to the base structure 212. However, the switch unit SW1 can be configured to be detachably and reattachably coupled to the electric-component housing 224 or both the electric-component housing 224 and the base structure 212 if needed and/or desired.

The additional switch unit SW2 is configured to be detachably coupled to at least one of the electric-component housing 224 and the base structure 212. The additional switch unit SW2 is configured to be detachably and reattachably coupled to at least one of the electric-component housing 224 and the base structure 212. In the present embodiment, the additional switch unit SW2 is configured to be detachably and reattachably coupled to the base structure 212. However, the additional switch unit SW2 can be configured to be detachably and reattachably coupled to the electric-component housing 224 or both the electric-component housing 224 and the base structure 212 if needed and/or desired.

Figure 26:
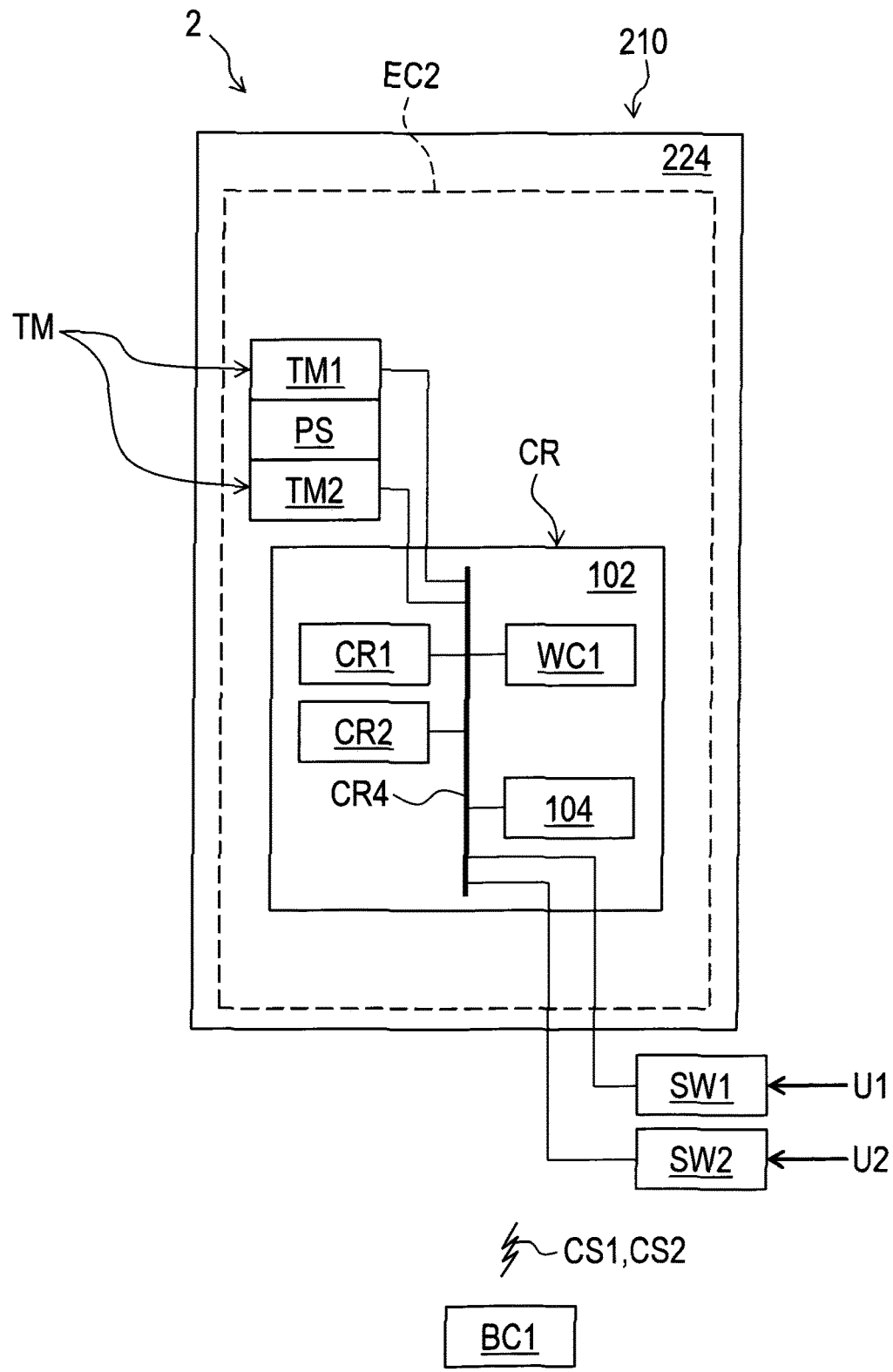
FIG. 26 is a schematic block diagram of the operating device illustrated in FIG. 24.

As seen in FIG. 26, the operating device 210 for the human-powered vehicle 2 comprises an electric component EC2. The electric component EC2 is configured to be electrically connected to the switch unit SW1. The electric component EC2 is configured to be electrically connected to the additional switch unit SW2. The electric component EC2 has substantially the same structure as the structure of the electric component EC of the first embodiment. In the present embodiment, the wired communicator WC2, the connection port 106, and the intermediate terminal TM3. However, the structure of the electric component EC2 is not limited to the above structure.

Figure 27:
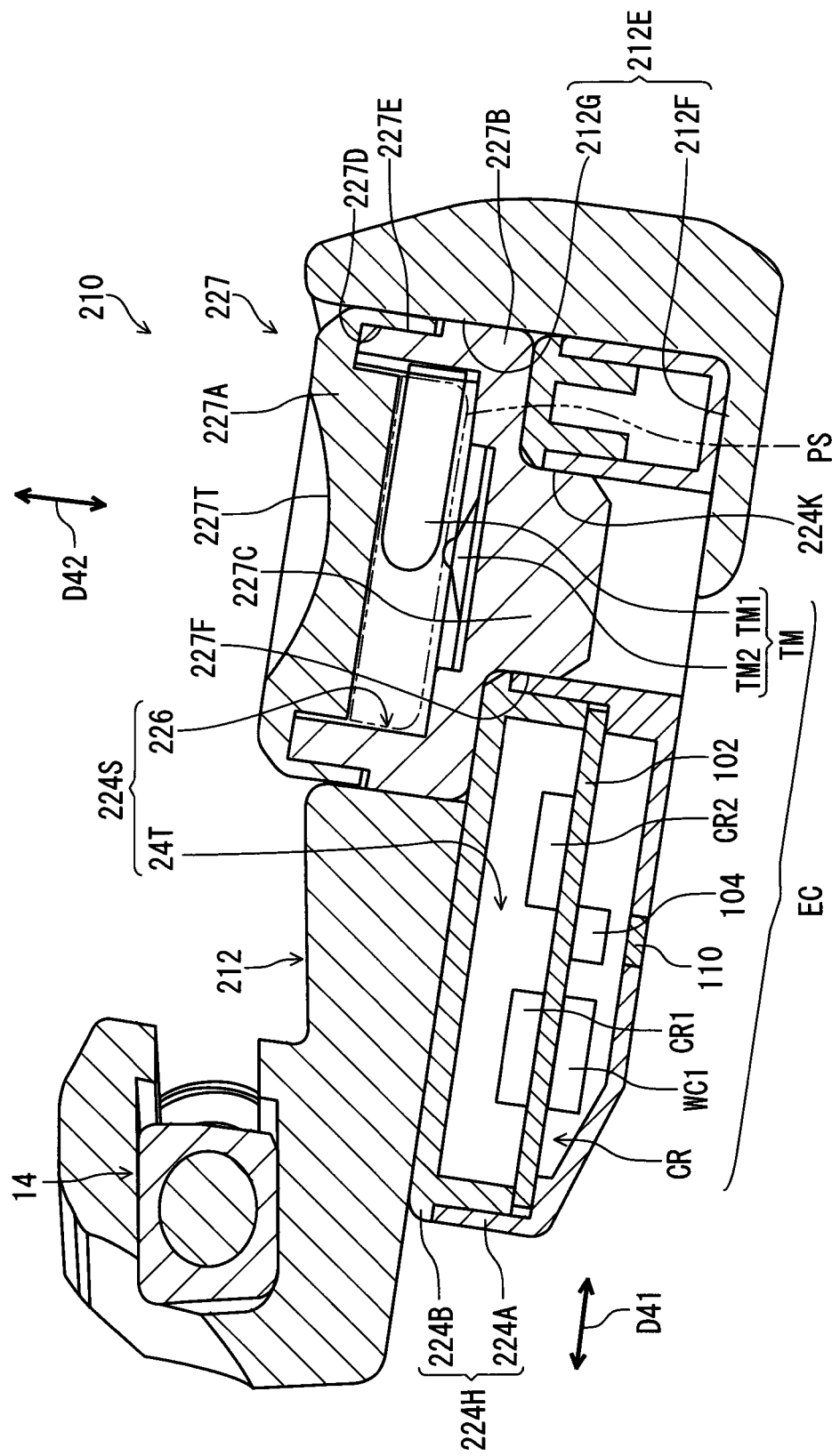
FIG. 27 is a cross-sectional view of the operating device taken along line XXVII-XXVII of FIG. 24.

As seen in FIG. 27, the electric-component housing 224 is configured to support the electric component EC2 such that the electric component EC2 is detachably coupled to the base structure 212 via the electric-component housing 224. The electric-component housing 224 is configured to support the electric component EC2 such that the electric component EC2 is detachably and reattachably coupled to the base structure 212 via the electric-component housing 224.

The electric-component housing 224 includes an accommodating space 224S. The electric component EC2 is at least partly provided in the accommodating space 224S. The electric-component housing 224 has substantially the same structure as the structure of the electric-component housing 224 of the first embodiment. In the present embodiment, the electric component EC2 is entirely provided in the accommodating space 224S. However, the electric component EC2 can be partly provided in the accommodating space 224S if needed and/or desired.

The electric-component housing 224 includes a housing body 224H. The housing body 224H includes the accommodating space 224S. The accommodating space 224S includes the electric-component accommodating space 24T. The housing body 224H includes the electric-component accommodating space 24T. The housing body 224H includes a first housing 224A and a second housing 224B. The second housing 224B is detachably and reattachably coupled to the first housing 224A. The first housing 224A and the second housing 224B define the electric-component accommodating space 24T.

The substrate 102 is provided in the accommodating space 224S. The wireless communicator WC1 is electrically mounted on the substrate 102 and is provided in the accommodating space 224S. The hardware processor CR1 and the memory CR2 are electrically mounted on the substrate 102 and are provided in the accommodating space 224S. In the present embodiment, the electric component EC2 is entirely provided in the accommodating space 224S. The substrate 102, the wireless communicator WC1, the controller CR, and the informing unit 104 are entirely provided in the accommodating space 224S. However, the electric component EC2 can be partially provided in the accommodating space 224S if needed and/or desired.

The accommodating space 224S includes a power-supply accommodating space 226 in which a power supply PS is to be provided. The power-supply accommodating space 226 has substantially the same structure as the structure of the power-supply accommodating space 26 of the first embodiment.

In the present embodiment, the power-supply accommodating space 226 is not in communication with the electric-component accommodating space 24T. However, the power-supply accommodating space 226 can be configured to be in communication with the electric-component accommodating space 24T if needed and/or desired.

The electric component EC2 includes the terminal TM. The terminal TM is contactable with the power supply PS in a state where the power supply PS is provided in the power-supply accommodating space 226. The terminal TM is provided in the accommodating space 224S.

In the present embodiment, the intermediate terminal TM3 is omitted from the terminal TM. The terminal TM includes the first terminal TM1 and the second terminal TM2. The first terminal TM1 and the second terminal TM2 are provided in the accommodating space 224S. The power-supply accommodating space 226 is provided between the first terminal TM1 and the second terminal TM2.

As seen in FIG. 27, the electric-component housing 224 includes a housing fastener 227. The housing body 224H is configured to be detachably coupled to the base structure 212 via the housing fastener 227. In the present embodiment, the housing fastener 227 includes a lid 227A, a casing 227B, and a fastening protrusion 227C. The lid 227A is detachably and reattachably coupled to the casing 227B. The lid 227A includes an internally threaded part 227D. The casing 227B includes an externally threaded part 227E. The internally threaded part 227D of the lid 227A is configured to be threadedly engaged with the externally threaded part 227E of the casing 227B. The lid 227A and the casing 227B define the power-supply accommodating space 226.

The fastening protrusion 227C protrudes from the casing 227B. The fastening protrusion 227C includes an externally threaded part 227F. The housing body 224H includes a threaded hole 227K. The externally threaded part 227F of the fastening protrusion 227C is configured to be threadedly engaged with the threaded hole 227K of the housing body 224H.

The housing fastener 227 is configured to be detachably attached to at least one of the base structure 212 and the housing body 224H. The housing fastener 227 is configured to be detachably and reattachably attached to the housing body 224H.

The base structure 212 includes an attachment opening 212E. At least one of the housing body 2411 and the housing fastener 27 is configured to be provided in the attachment opening 212E. In the present embodiment, the housing body 2411 and the housing fastener 27 are configured to be provided in the attachment opening 212E. However, only one of the housing body 2411 and the housing fastener 27 can be configured to be provided in the attachment opening 212E if needed and/or desired.

The attachment opening 212E includes a first attachment opening 212F and a second attachment opening 212G. The first attachment opening 212F is in communication with the second attachment opening 212G. The housing body 224H is configured to be provided in the first attachment opening 212F. The housing fastener 227 is configured to be provided in the second attachment opening 212G.

The housing body 224H is configured to be inserted into and removed from the first attachment opening 212F in a first direction D41. The housing fastener 227 is configured to be inserted into and removed from the second attachment opening 212G in a second direction D42. The first direction D41 is different from the second direction D42. In the present embodiment, the first direction D41 is perpendicular to the second direction D42. However, the first direction D41 can be non-perpendicular to the second direction D42 if needed and/or desired.

As seen in FIG. 24, at least one of the first direction D41 and the second direction D42 is non-parallel to the attachment axis A3. In the present embodiment, the first direction D41 and the second direction D42 are non-parallel to the attachment axis A3. However, at least one of the first direction D41 and the second direction D42 can be perpendicular to or parallel to the attachment axis A3 if needed and/or desired.

The housing fastener 227 includes a tool engagement part 227T with which a tool is to engage. The tool engagement part 227T include a tool engagement recess. However, the tool engagement part 227T of the housing fastener 227 can be omitted from the housing fastener 227 if needed and/or desired. The housing fastener 227 can be omitted from the electric-component housing 224 if needed and/or desired.

As seen in FIG. 25, the switch unit SW1 and the additional switch unit SW2 are coupled to the base structure 212 at the attachment axis A3. The base member 28 and the additional base member 30 are coupled to the base structure 212 at the attachment axis A3. The base member 28 is configured to be detachably and reattachably coupled to the base structure 212. The additional base member 30 is configured to be detachably and reattachably coupled to the base structure 212.

The switch unit SW1 and the additional switch unit SW2 are coupled to the base structure 212 such that at least one of the switch unit SW1 and the additional switch unit SW2 are adjustable about the attachment axis A3. The base member 28 and the additional base member 30 are coupled to the base structure 212 such that at least one of the switch unit SW1 and the additional switch unit SW2 are adjustable about the attachment axis A3.

The switch unit SW1 is pivotally coupled to the base structure 212 about the attachment axis A3. The additional switch unit SW2 is pivotally coupled to the base structure 212 about the attachment axis A3. The base member 28 is pivotally coupled to the base structure 212 about the attachment axis A3. The additional base member 30 is pivotally coupled to the base structure 212 about the attachment axis A3.

Figure 28:
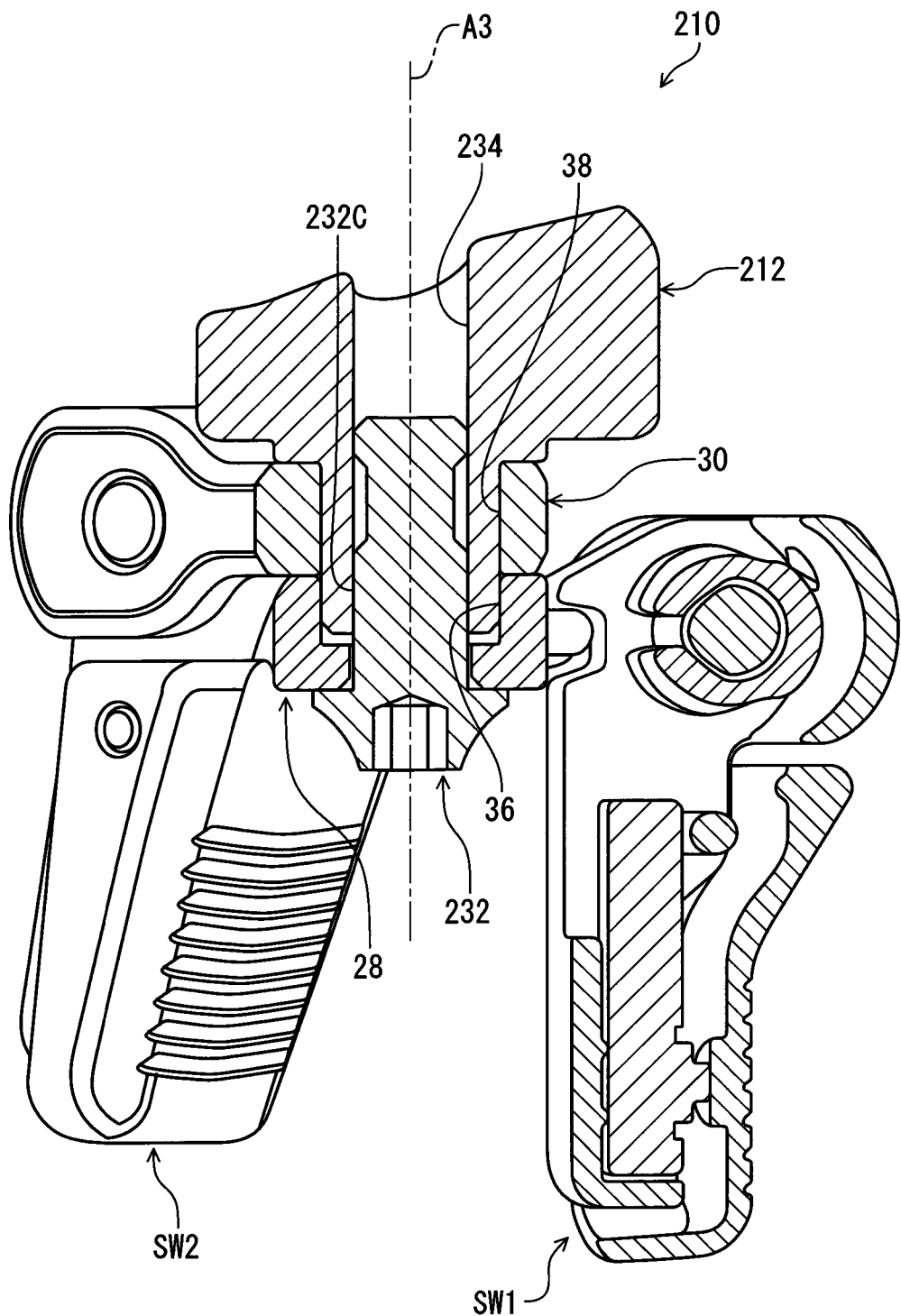
FIG. 28 is a cross-sectional view of the operating device taken along line XXVIII-XXVIII of FIG. 24.

As seen in FIG. 28, the operating device 210 further comprises a fastener 232. The fastener 232 is configured to fasten at least one of the switch unit SW1 and the additional switch unit SW2 to the base structure 212. The fastener 232 is configured to fasten at least one of the base member 28 and the additional base member 30 to the base structure 212. In the present embodiment, the fastener 232 is configured to fasten the switch unit SW1 and the additional switch unit SW2 to the base structure 212. The fastener 232 is configured to fasten the base member 28 and the additional base member 30 to the base structure 212. The fastener 232 defines the attachment axis A3. The fastener 232 extends along the attachment axis A3.

The base structure 212 includes a fastener hole 234. The fastener 232 extends through the first opening 36 and the second opening 38 in a fastening state where the fastener 232 fastens the base member 28 and the additional base member 30 to the base structure 212. The fastener 232 extends through the fastener hole 234, the first opening 36, and the second opening 38 in the fastening state.

One of the base member 28 and the additional base member 30 is held between the base structure 212 and the other of the base member 28 and the additional base member 30 in the fastening state. In the present embodiment, the base member 28 is held between the base structure 212 and the additional base member 30 in the fastening state. However, the additional base member 30 is held between the base structure 212 and the base member 28 in the fastening state.

The fastener 232 includes a rod 232A, a head 232B, and an externally threaded part 232C. The rod 232A extends along the attachment axis A3. The head 232B is provided at an end of the rod 232A. The externally threaded part 232C is provided on an outer peripheral surface of the rod 232A. The fastener hole 234 includes a threaded hole 234A. The externally threaded part 232C of the fastener 232 is configured to be threadedly engaged with the threaded hole 234A of the fastener hole 234.

The fastener 232 is a separate member from the base member 28 and the additional base member 30. However, the fastener 232 can be integrally provided with one of the base member 28 and the additional base member 30 as a one-piece unitary member if needed and/or desired. In such an embodiment, the fastener 232 can be provided as a rivet. The fastener 232 can be omitted from the operating device 210 if needed and/or desired.

As seen in FIG. 24, the switch unit SW1 includes a switch cover 254. The switch cover 254 is configured to be attached to the switch base 52. In the present embodiment, the switch unit SW1 includes a cover pin 255. The cover pin 255 is configured to couple the switch cover 254 to the switch base 52.

The additional switch unit SW2 includes an additional switch cover 274. The additional switch cover 274 is configured to be attached to the additional switch base 272. In the present embodiment, the additional switch unit SW2 includes a cover pin 275. The cover pin 275 is configured to couple the additional switch cover 274 to the additional switch base 72.

Figure 29:
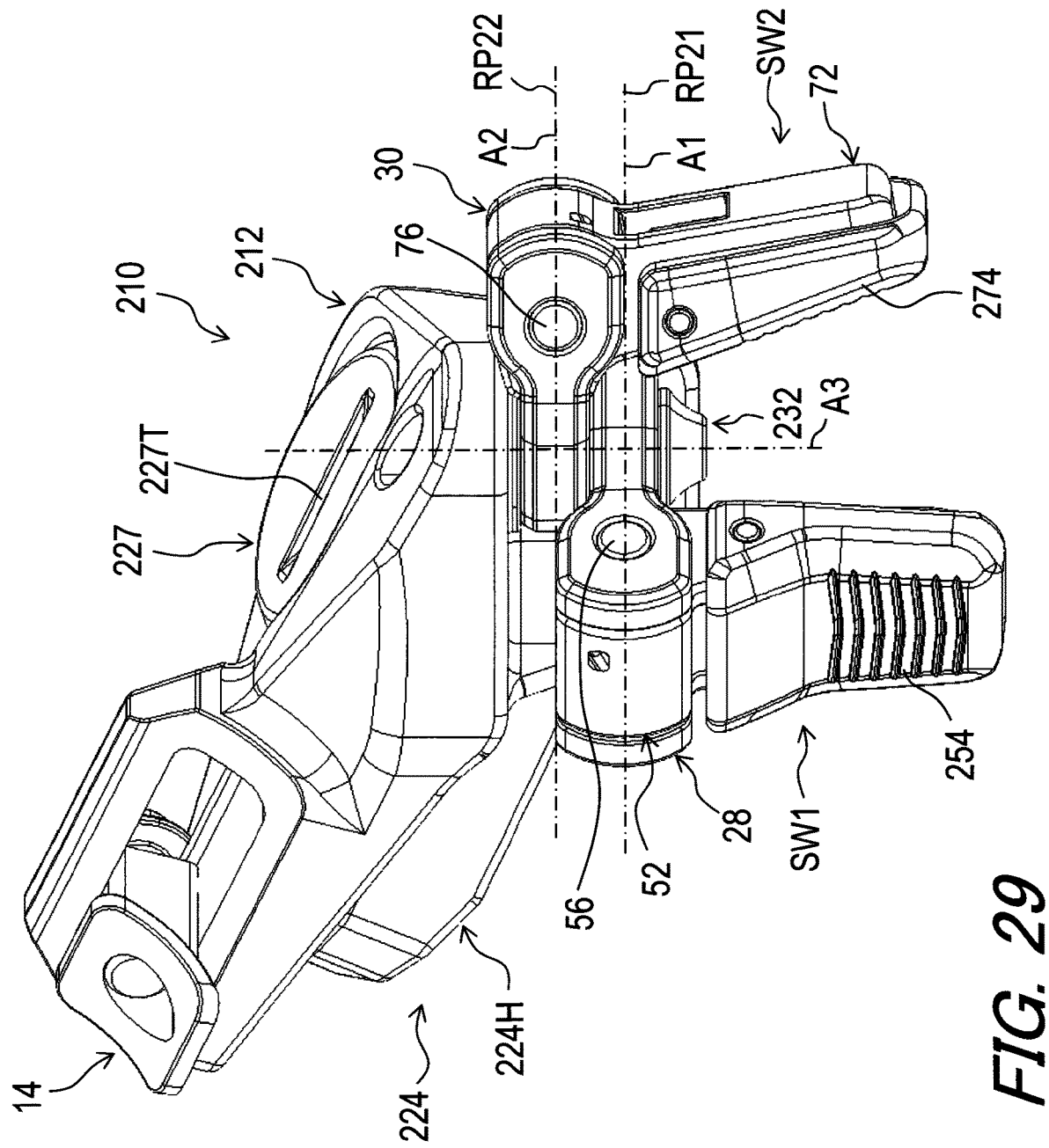
FIG. 29 is a perspective view of the operating device illustrated in FIG. 24.

As seen in FIG. 29, a reference plane RP21 is perpendicular to the attachment axis A3. The pivot axis A1 is defined on the reference plane RP21. A reference plane RP22 is perpendicular to the attachment axis A3. The additional pivot axis A2 is defined on the reference plane RP22. In the present embodiment, the reference plane RP21 is spaced apart from the reference plane RP22 along the attachment axis A3. The pivot axis A1 and the additional pivot axis A2 do not intersect with each other. However, the pivot axis A1 and the additional pivot axis A2 can define a reference plane.

Figure 30:
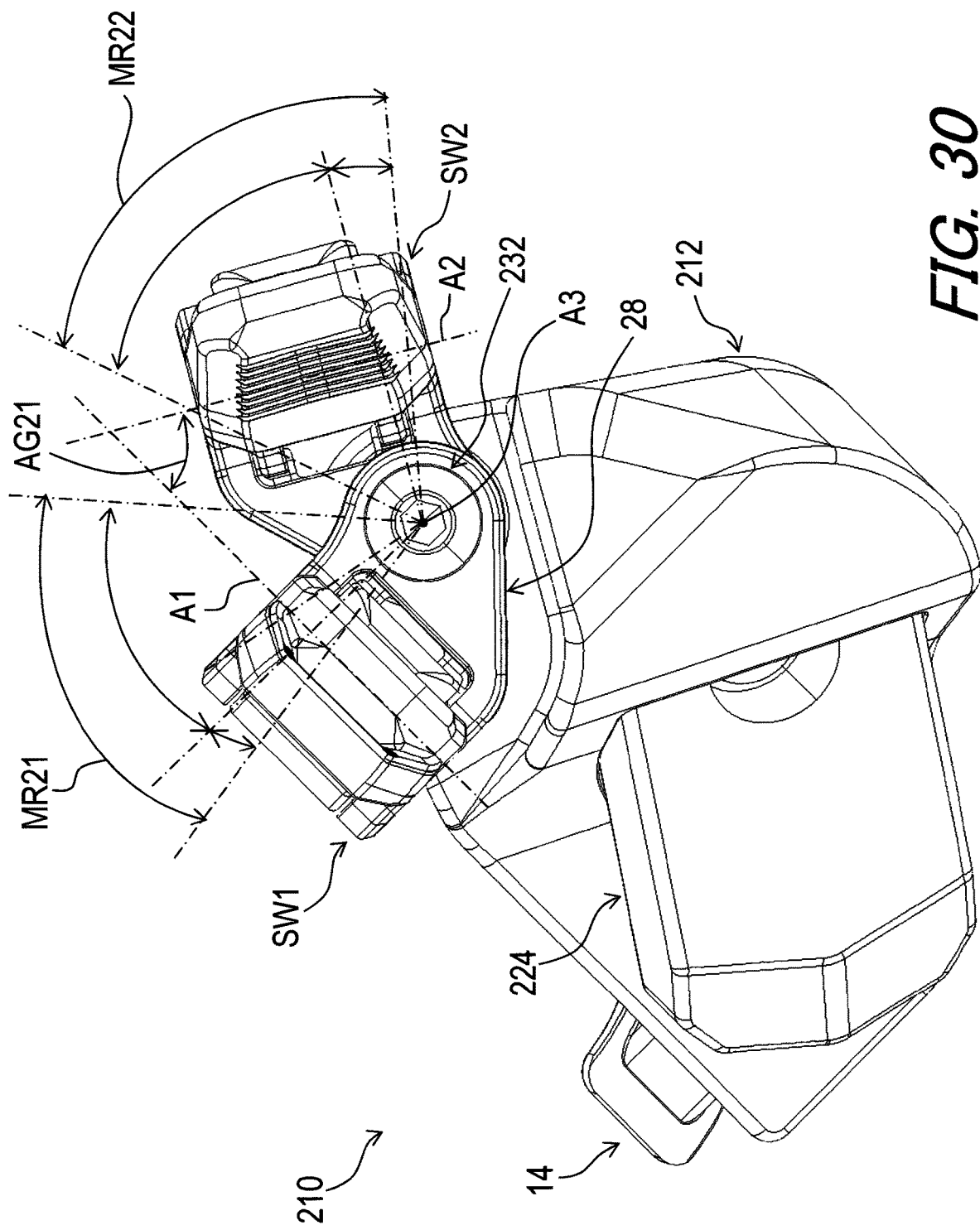
FIG. 30 is a bottom view of the operating device illustrated in FIG. 24.

As seen in FIG. 30, the fastener 232 is configured to fasten the switch unit SW1 and the additional switch unit SW2 to the base structure 212 such that at least one of the switch unit SW1 and the additional switch unit SW2 is adjustably coupled relative to the base structure 212 about the attachment axis A3. The pivot axis A1 and the additional pivot axis A2 are configured to be adjustable relative to each other. At least one of the base member 28 and the additional base member 30 is adjustably coupled to the base structure 212 such that a first angle AG21 defined between the pivot axis A1 and the additional pivot axis A2 is variable on the reference plane RP. In the present embodiment, the first angle AG21 ranges from 30 degrees to 90 degrees as viewed along the attachment axis A3. However, the range of the first angle AG21 is not limited to the above range.

In the present embodiment, the switch unit SW1 is pivotable relative to the base structure 212 about the attachment axis A3 within a movable range MR21 in a released state where the fastener 232 does not fasten the switch unit SW1 and the additional switch unit SW2 to the base structure 212. The base member 28 is pivotable relative to the base structure 212 about the attachment axis A3 within a movable range MR21 in the released state. The switch unit SW1 is positioned in any one of circumferential positions defined within the movable range MR21 in the fastening state.

The additional switch unit SW2 is pivotable relative to the base structure 212 about the attachment axis A3 within an additional movable range MR22 in the released state. The additional base member 30 is pivotable relative to the base structure 212 about the attachment axis A3 within the additional movable range MR22 in the released state. The additional switch unit SW2 is positioned in any one of circumferential positions defined within the additional movable range MR22 in the fastening state.

Figure 31:
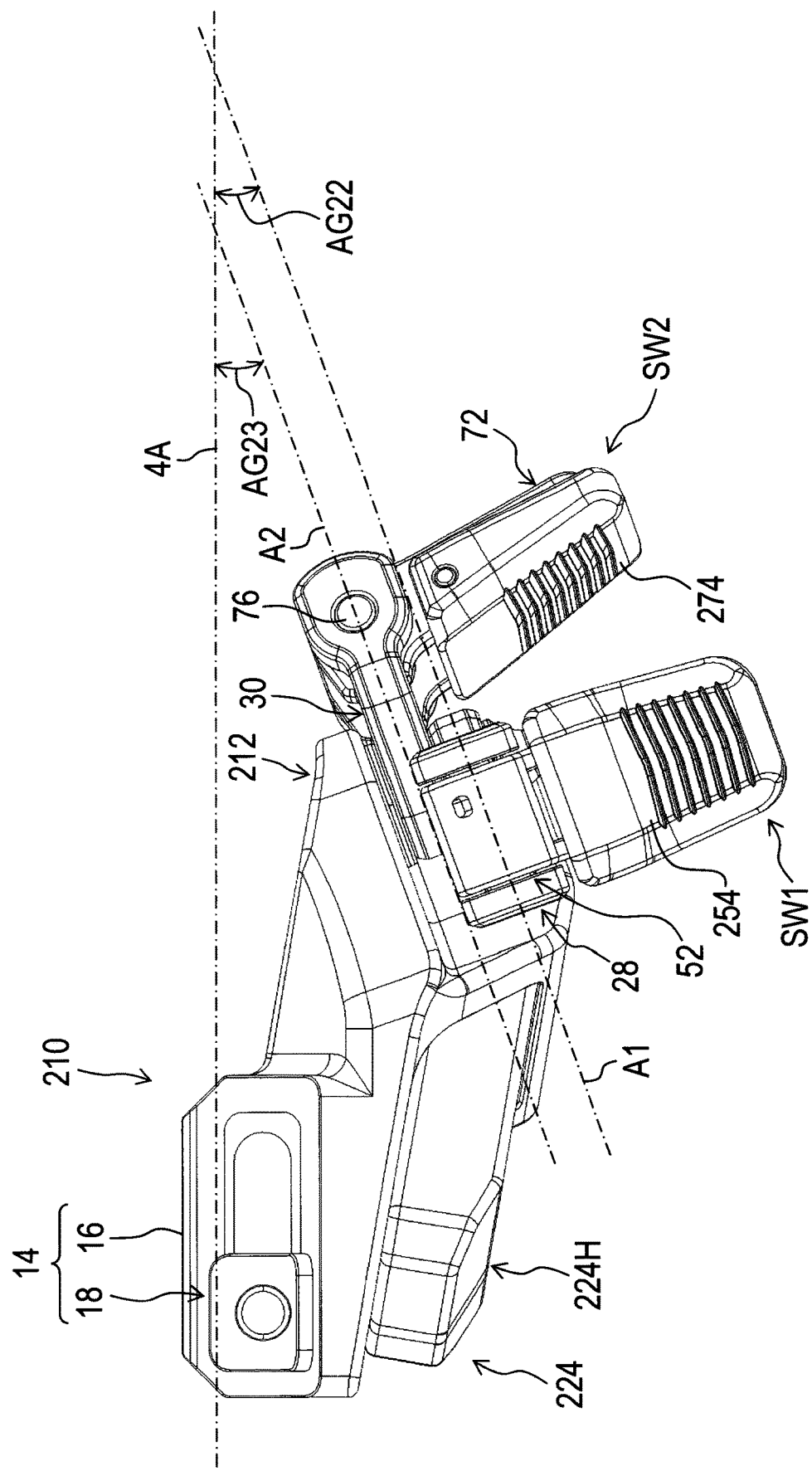
FIG. 31 is an elevational view of the operating device illustrated in FIG. 24.

As seen in FIG. 31, a second angle AG22 is defined between the reference plane RP21 and the longitudinal center axis 4A of the tubular part 4. The second angle AG22 ranges from 10 degrees to 30 degrees. However, the second angle AG22 is not limited to the above range.

A second angle AG23 is defined between the reference plane RP22 and the longitudinal center axis 4A of the tubular part 4. The second angle AG23 ranges from 10 degrees to 30 degrees. However, the second angle AG23 is not limited to the above range.

Modifications

Figure 32:
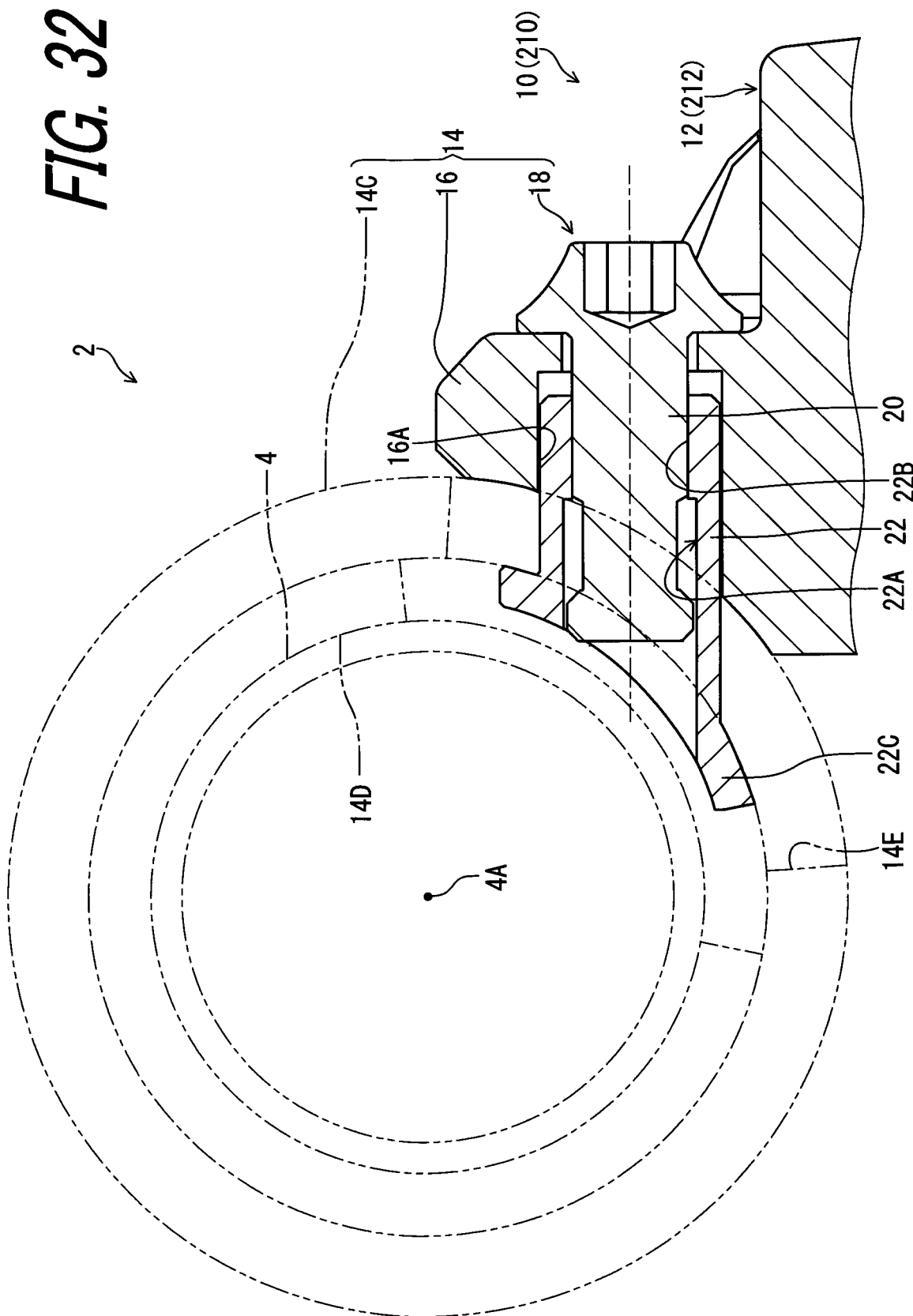
FIG. 32 is a cross-sectional view of an operating device in accordance with a modification.

In the first and second embodiment, as seen in FIGS. 2 and 24, the mounting structure 14 includes the mounting base 16 and the adjustment member 18. The adjustment member 18 is adjustably attached to the mounting base 16 and is configured to adjustably couple the mounting base 16 to the mounting member 6C of the additional operating device 6. As seen in FIG. 32, however, the mounting structure 14 can include a mounting member 14C. The mounting member 14C has substantially the same structure as the structure of the mounting member 6C of the additional operating device 6. The mounting member 14C includes a mounting opening 14D through which the tubular part 4 of the human-powered vehicle 2 extends in a mounting state where the mounting structure 14 couples the base structure 12 or 212 to the tubular part 4 of the human-powered vehicle 2. The mounting member 14C includes an additional elongated opening 14E. The adjustment member 18 is configured to be movably provided in the additional elongated opening 14E. The adjustment member 18 is provided in the elongated opening 16A and the additional elongated opening 14E in the mounting state where the mounting structure 14 couples the base structure 12 or 212 to the tubular part of the human-powered vehicle 2. Furthermore, the mounting structure 14 can include only the mounting member 14C. The mounting base 16 and the adjustment member 18 can be omitted from the mounting structure 14 if needed and/or desired.

Figure 33:
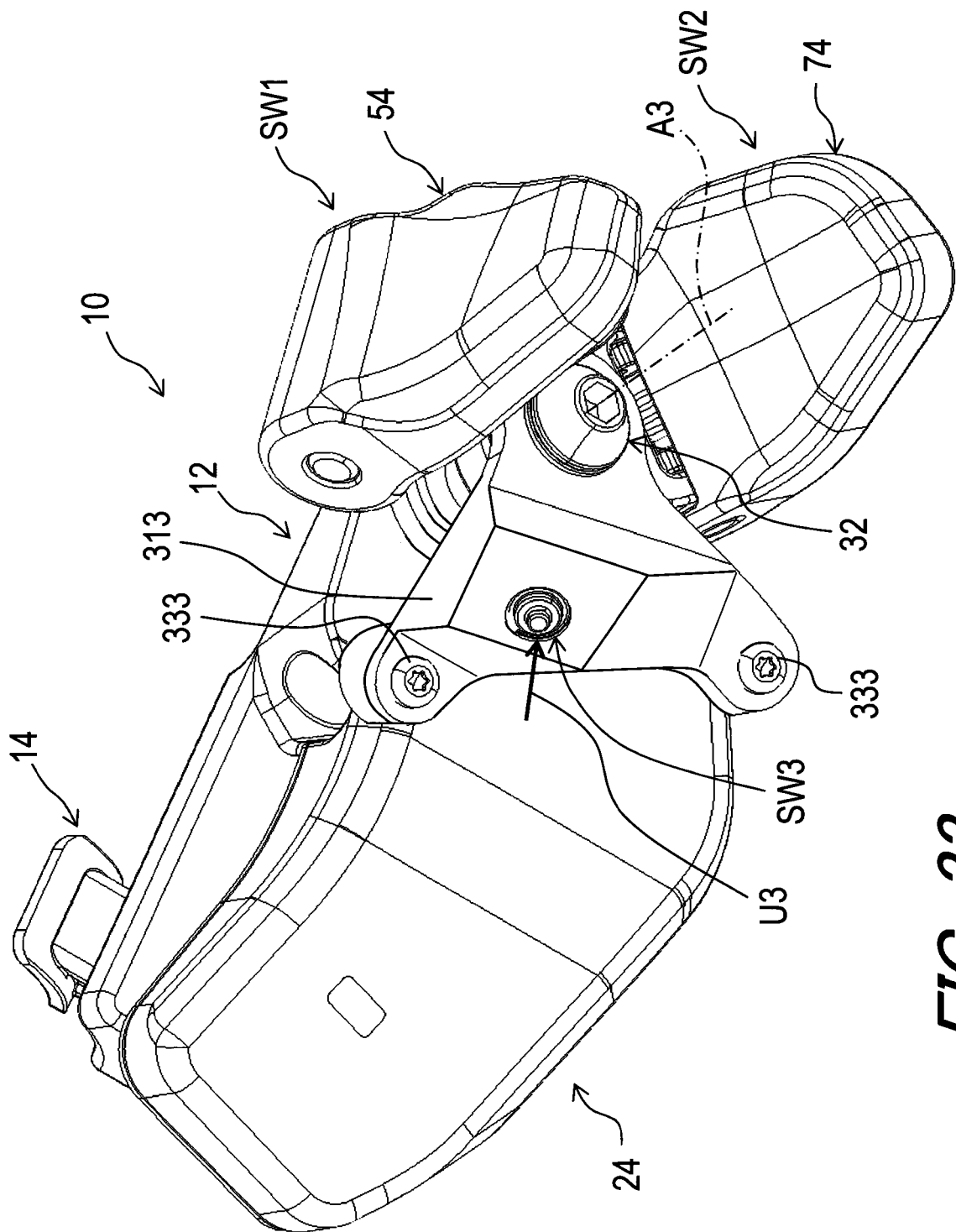
FIG. 33 is a perspective view of an operating device in accordance with a modification.

As seen in FIG. 33, the operating device 10 can further comprise an additional member 313. The additional member 313 is configured to be detachably attached to at least one of the base structure 12 and the electric-component housing 24. The additional member 313 is configured to be detachably attached to the base structure 12 and the electric-component housing 24. The additional member 313 is a separate member from the base structure 12, the electric-component housing 24, the switch unit SW1, and the additional switch unit SW2. The additional member 313 is configured to be detachably and reattachably coupled to the base structure 212 with the fastener 32. The additional member 313 is configured to be detachably and reattachably coupled to the electric-component housing 24 with additional fasteners 333.

Furthermore, the operating device 10 can further comprise a third switch unit SW3 configured to be activated in response to a third user input U3. The third switch unit SW3 is provided to the additional member 313. The third switch unit SW3 is at least partially provided in the additional member 313. The additional member 313 and the third switch unit SW3 can be applied to the operating device 210 of the second embodiment. The third switch unit SW3 includes a third switch having substantially the same structure as the structure of the switch 50 of the switch unit SW1. Thus, it will not be described in detail here for the sake of brevity. The third switch unit SW3 can be directly attached to at least one of the base structure 12 and the electric-component housing 24 without the additional member 313 if needed and/or desired.

In the first and second embodiments and the modifications thereof, the fastener 32 or 232 includes the externally threaded part 40C or 232C. However, the fastener 32 or 232 can be attached to the base structure 12 or 212 with other structures such as press-fitting or an adhesive agent if needed and/or desired. At least part of the fastener 32 or 232 can be integrally provided with the base structure 12 or 212 as a one-piece unitary member if needed and/or desired. Furthermore, the fastener 32 or 232 can be omitted from the operating device 10 or 210. In such an embodiment, at least one of the base member 28 and the additional base member 30 can include a structure (e.g., a protrusion) configured to be coupled to the base structure 12 or 212.

In the first embodiment and the modifications thereof, the electric component EC of the operating device 10 includes the wireless communicator WC1 and the wired communicator WC2. However, the electric component EC can include only one of the wireless communicator WC1 and the wired communicator WC2 if needed and/or desired. Furthermore, the electric component EC includes the connection port 106 configured to be electrically connected to the wired communicator WC2. However, the connection port 106 can be omitted from the electric component EC, and the wired communicator WC2 can be electrically connected to an electric cable if needed and/or desired. The electric cable electrically connected to the wired communicator WC2 can be provided in any position in the operating device 10. The electric cable can extend from any portion of the operating device 10 to an additional device. Similarly, the position of the connection port 106 is not limited to the position illustrated in the first embodiment.

In the second embodiment and the modifications thereof, the electric component EC2 of the operating device 210 includes the wireless communicator WC1 and does not include the wired communicator WC2. However, the electric component EC2 can include only the wired communicator WC2 or both the wireless communicator WC1 and the wired communicator WC2 if needed and/or desired. In such embodiments, the electric component EC2 can include the connection port 106 configured to be electrically connected to the wired communicator WC2 as described in the first embodiment. The connection port 106 can be provided in any position in the operating device 210. Furthermore, the wired communicator WC2 can be electrically connected to an electric cable without the connection port 106 if needed and/or desired. The electric cable electrically connected to the wired communicator WC2 can be provided in any position in the operating device 210. The electric cable can extend from any portion of the operating device 10 to an additional device.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
    a base structure configured to be mounted to the human-powered vehicle;
    a switch unit configured to be activated in response to a user input, the switch unit including a switch pivotally provided in relation to the base structure for pivotal activation in response to the user input;
    an electric component configured to be electrically connected to the switch unit; and
    an electric-component housing configured to be detachably coupled to the base structure, the electric-component housing configured to support the electric component such that the electric component is detachably coupled to the base structure via the electric-component housing, wherein
    the electric-component housing includes an accommodating space and an insertion opening,
    the accommodating space includes a power-supply accommodating space in which a power supply is to be provided,
    the power supply has a thickness extending along an axial direction of the power supply, and
    the power supply is inserted into the insertion opening in a direction orthogonal to the axial direction when the power supply is inserted into the power-supply accommodating space.

2. An operating device for a human-powered vehicle, comprising:
    a base structure configured to be mounted to the human-powered vehicle;
    a switch unit configured to be activated in response to a user input, the switch unit including a switch pivotally provided in relation to the base structure for pivotal activation in response to the user input;
    an electric component configured to be electrically connected to the switch unit;
    an electric-component housing configured to be detachably coupled to the base structure; and
    the switch unit being configured to be detachably coupled to at least one of the electric-component housing and the base structure, wherein
    the electric-component housing includes an accommodating space and an insertion opening,
    the accommodating space includes a power-supply accommodating space in which a power supply is to be provided,
    the power supply has a thickness extending along an axial direction of the power supply, and
    the power supply is inserted into the insertion opening in a direction orthogonal to the axial direction when the power supply is inserted into the power-supply accommodating space.

3. The operating device according to claim 2, wherein
    a lateral side surface of the power supply extending along a circumferential direction of the axial direction, and
    a bottom of the accommodating space is configured to receive the lateral side surface of the power supply.

4. The operating device according to claim 1, wherein the electric component includes at least one of a substrate, a wireless communicator, and a wired communicator.

5. The operating device according to claim 1, wherein the electric component is at least partly provided in the accommodating space.

6. The operating device according to claim 5, wherein the electric component includes a substrate, and the substrate is provided in the accommodating space.

7. The operating device according to claim 6, wherein the electric component includes a wireless communicator, and the wireless communicator is electrically mounted on the substrate and is provided in the accommodating space.

8. The operating device according to claim 5, wherein
the electric component includes a terminal contactable with the power supply in a state where the power supply is provided in the power-supply accommodating space, and
the terminal is provided in the accommodating space.

9. The operating device according to claim 5, wherein
the electric-component housing includes a housing body,
the housing body includes the accommodating space, and
the housing body is configured to be detachably coupled to the base structure via a housing fastener.

10. The operating device according to claim 9, wherein
the housing fastener is configured to be detachably attached to at least one of the base structure and the housing body.

11. The operating device according to claim 9, wherein
the housing fastener includes a tool engagement part with which a tool is to engage.

12. The operating device according to claim 9, wherein
the base structure includes an attachment opening, and
at least one of the housing body and the housing fastener is configured to be provided in the attachment opening.

13. The operating device according to claim 12, wherein
the attachment opening includes a first attachment opening and a second attachment opening,
the housing body is configured to be provided in the first attachment opening, and
the housing fastener is configured to be provided in the second attachment opening.

14. The operating device according to claim 13, wherein
the first attachment opening is in communication with the second attachment opening.

15. The operating device according to claim 13, wherein
the housing body is configured to be inserted into and removed from the first attachment opening in a first direction,
the housing fastener is configured to be inserted into and removed from the second attachment opening in a second direction, and
the first direction is different from the second direction.

16. The operating device according to claim 15, wherein
the switch unit is pivotally coupled to the base structure about an attachment axis, and
at least one of the first direction and the second direction is non-parallel to the attachment axis.

17. The operating device according to claim 1, further comprising
a mounting structure configured to couple the base structure to the human-powered vehicle.

18. The operating device according to claim 17, wherein
the mounting structure includes a mounting member, and
the mounting member includes a mounting opening through which a tubular part of the human-powered vehicle extends in a mounting state where the mounting structure couples the base structure to the tubular part of the human-powered vehicle.

19. The operating device according to claim 18, wherein
the mounting structure includes a mounting base and an adjustment member, and
the mounting base is secured to the base structure, and the adjustment member is adjustably attached to the mounting base and is configured to adjustably couple the mounting base to the mounting member.

20. The operating device according to claim 1, further comprising:
an additional switch unit configured to be activated in response to an additional user input; and
a fastener configured to fasten the switch unit and the additional switch unit to the base structure.

21. The operating device according to claim 1, further comprising:
an additional member configured to be detachably attached to at least one of the base structure and electric-component housing.

22. The operating device according to claim 21, further comprising:
a third switch unit configured to be activated in response to a third user input, the third switch unit being provided to the additional member.

23. The operating device according to claim 1, wherein
a lateral side surface of the power supply extending along a circumferential direction of the axial direction, and
a bottom of the accommodating space is configured to receive the lateral side surface of the power supply.

* * * * *